May 10, 1938. N. A. LUDINGTON 2,117,067
TRANSPORTATION MEANS
Filed June 8, 1933 21 Sheets-Sheet 1
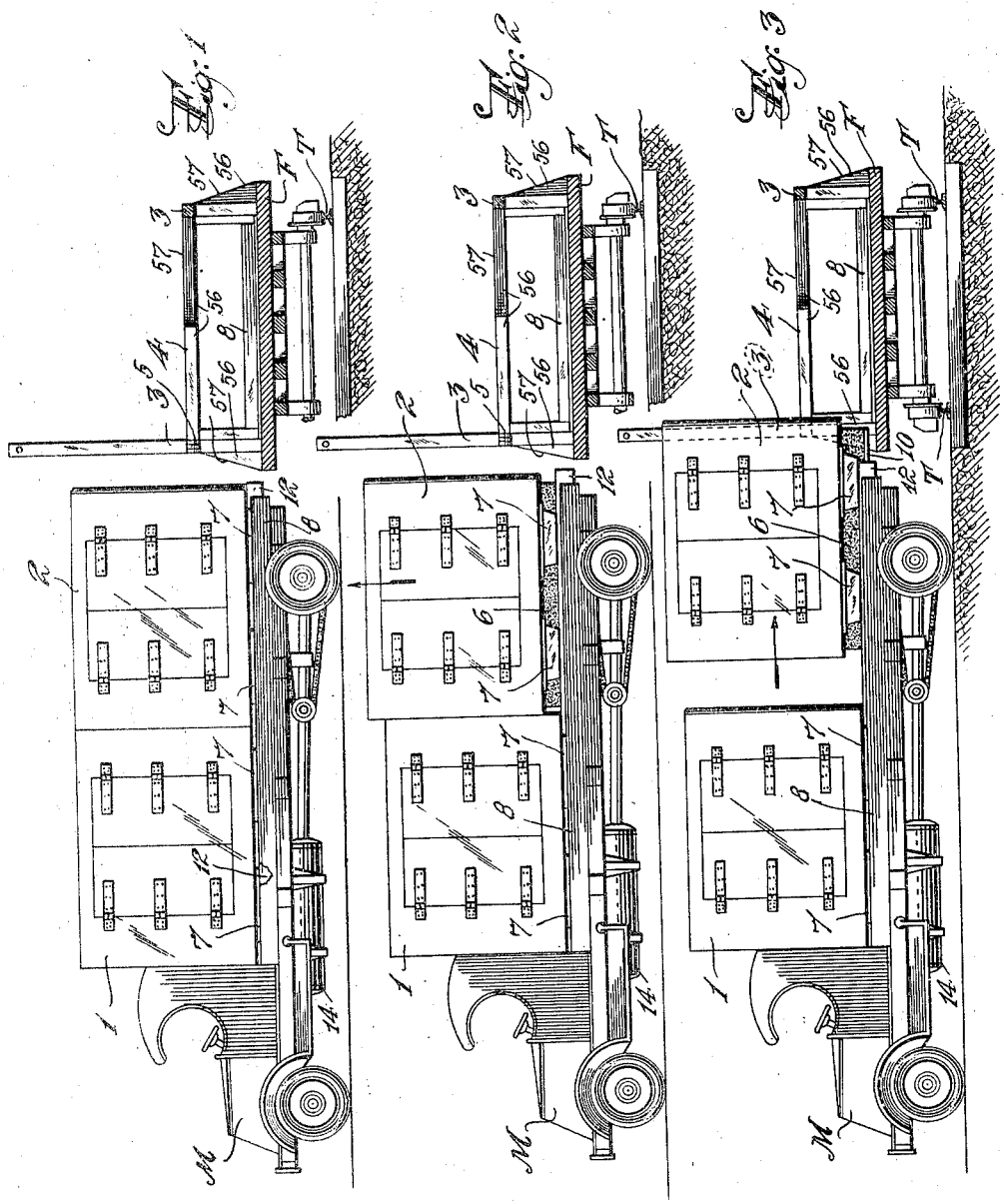
INVENTOR
Nelson A. Ludington
BY
A. D. T. Libby
ATTORNEY

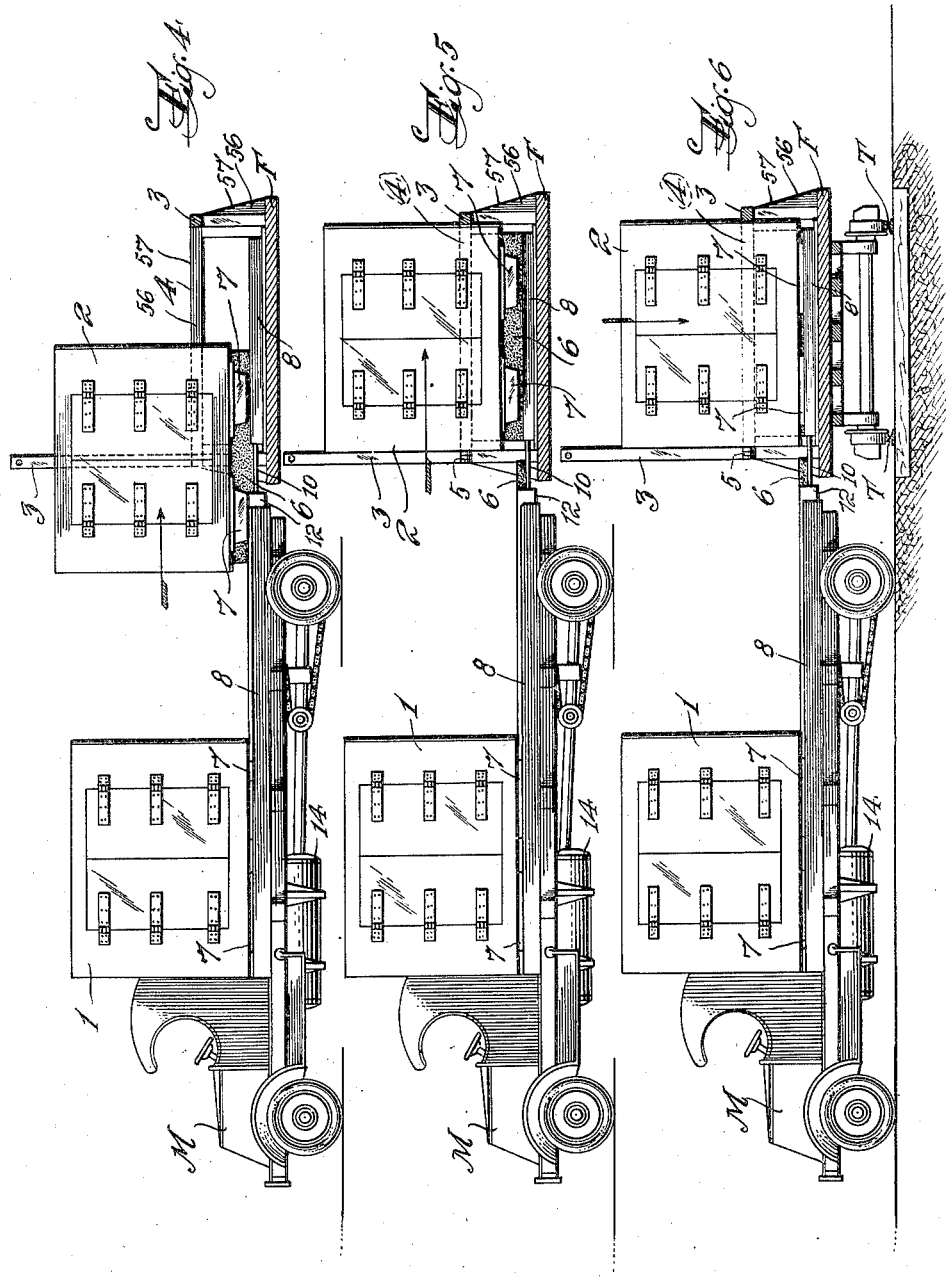

May 10, 1938.  N. A. LUDINGTON  2,117,067
TRANSPORTATION MEANS
Filed June 8, 1933  21 Sheets-Sheet 3
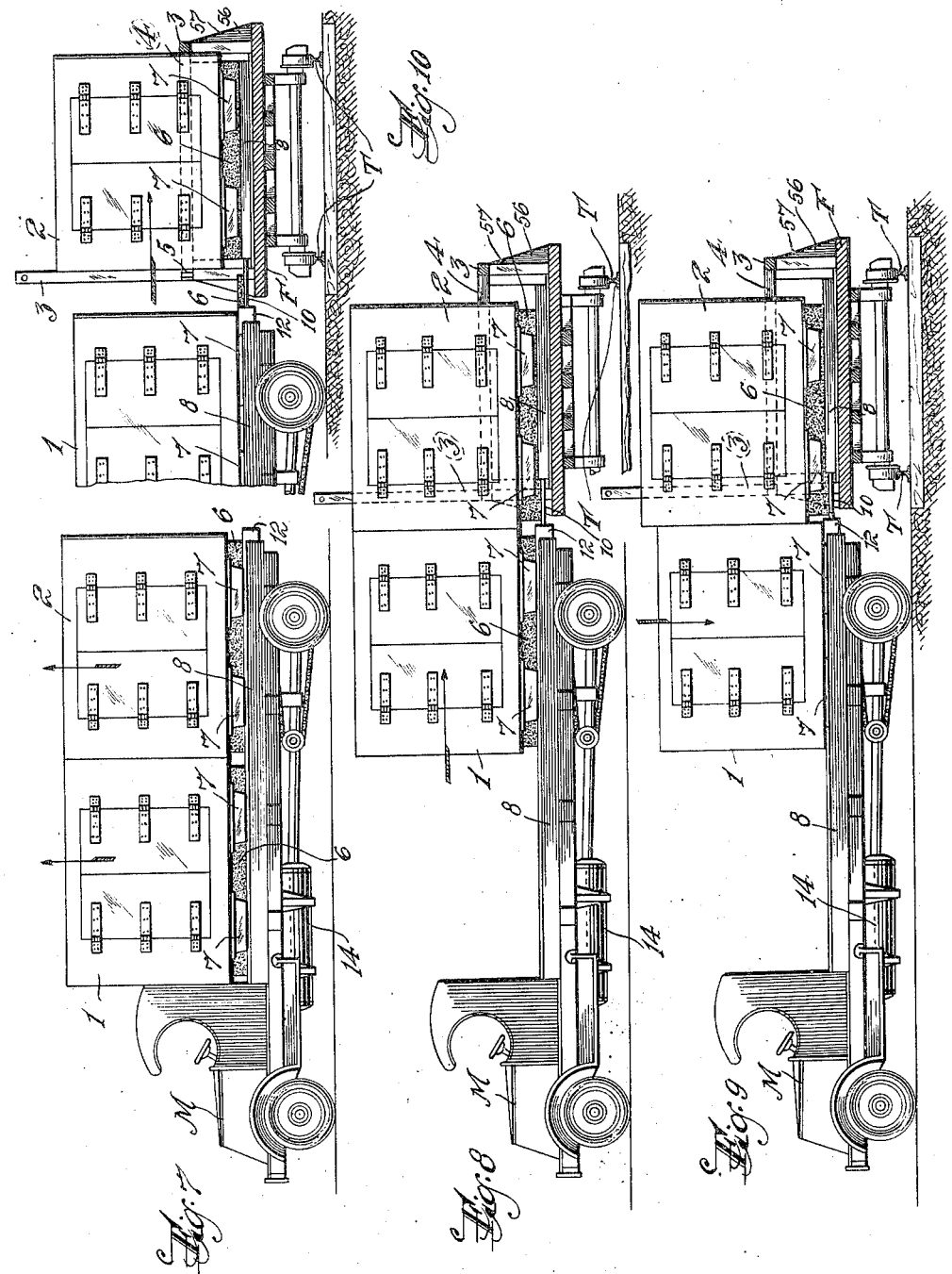
INVENTOR
Nelson A. Ludington
BY
A. D. T. Libby
ATTORNEY

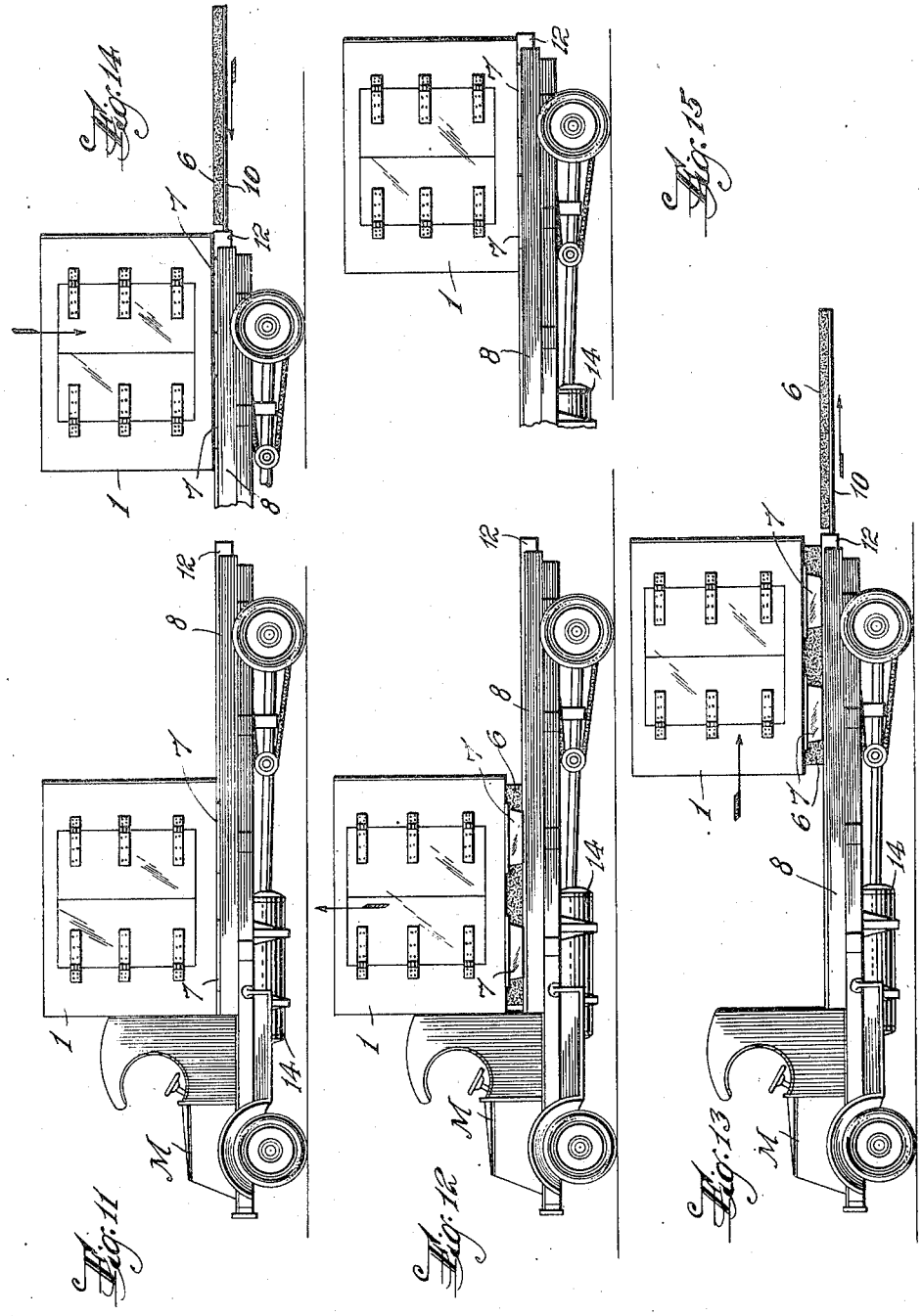

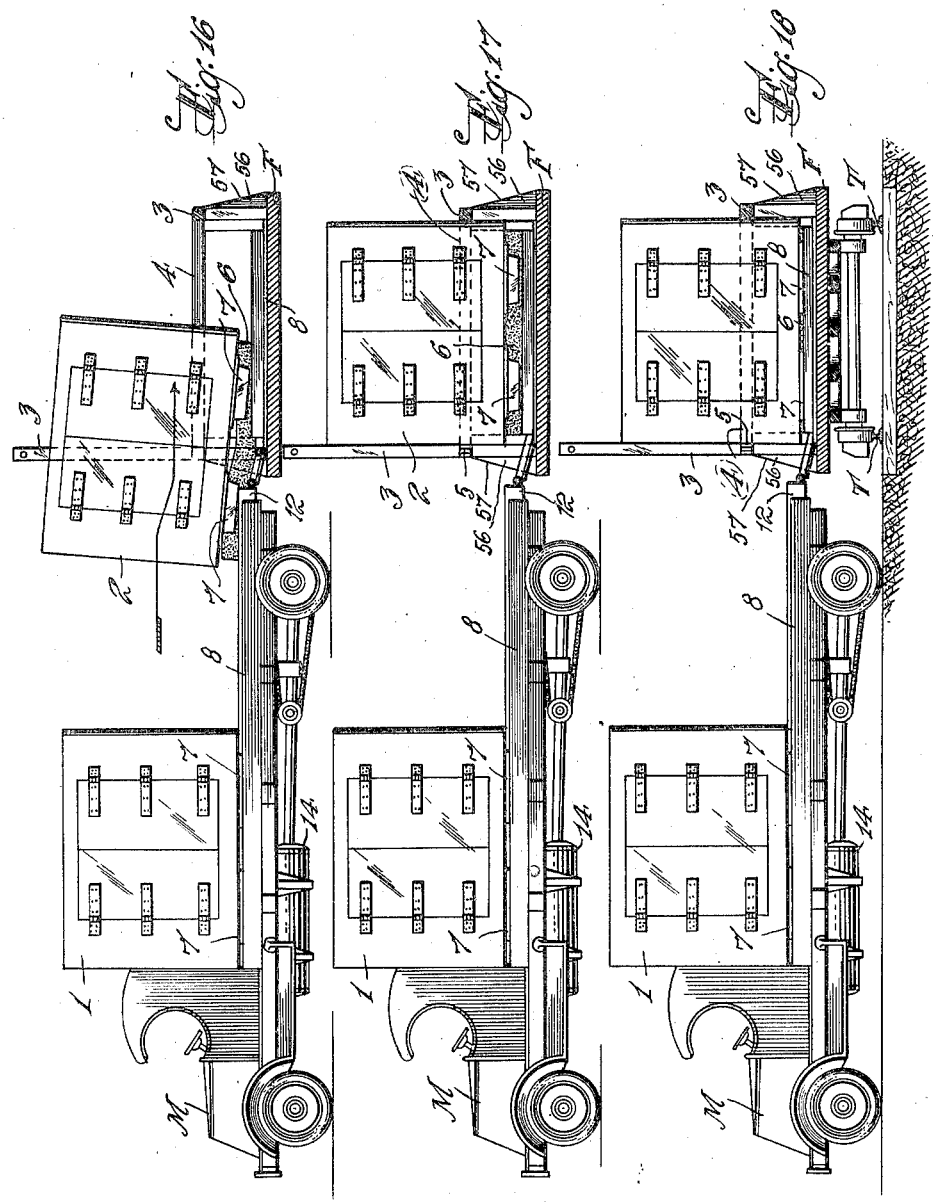

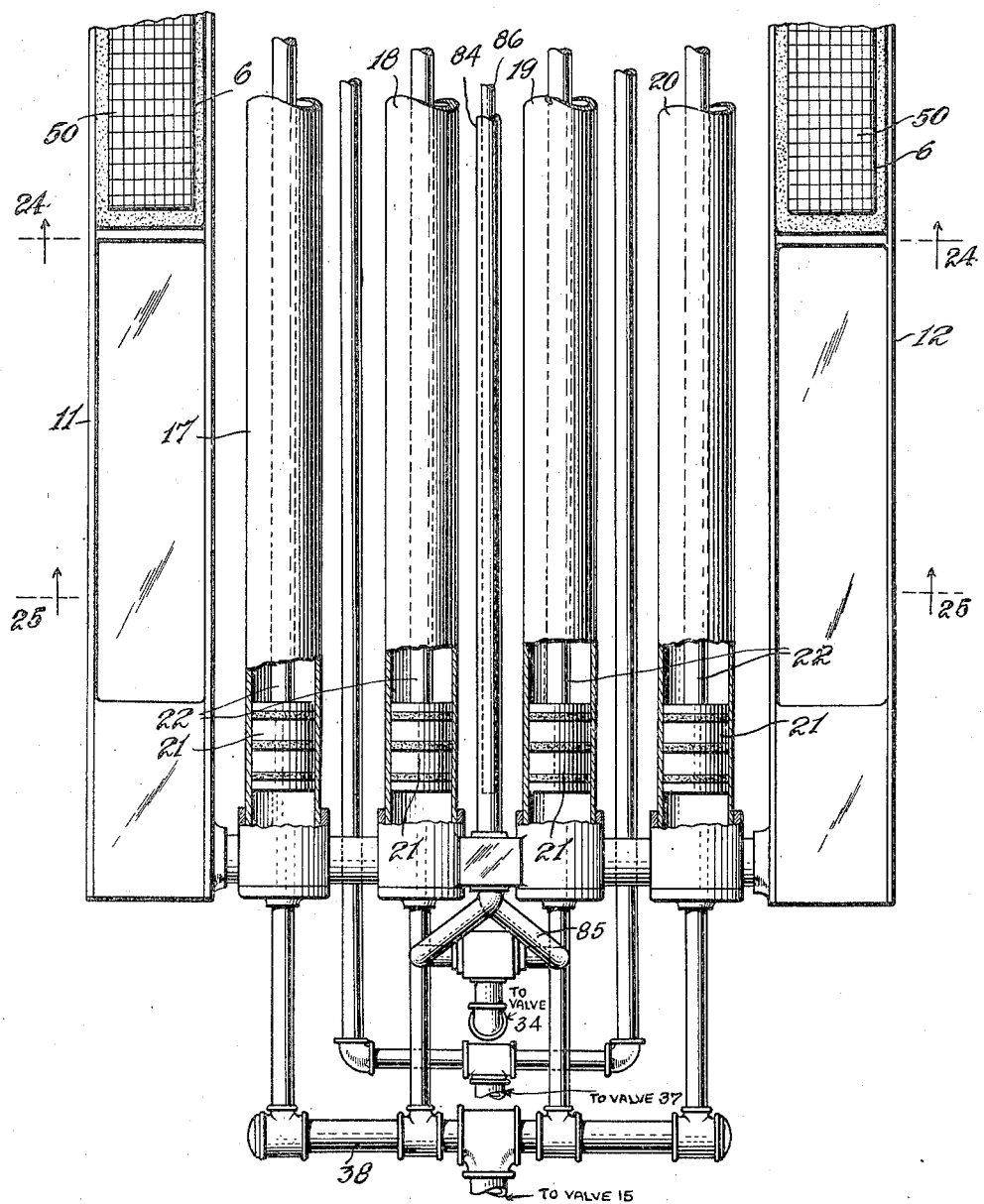

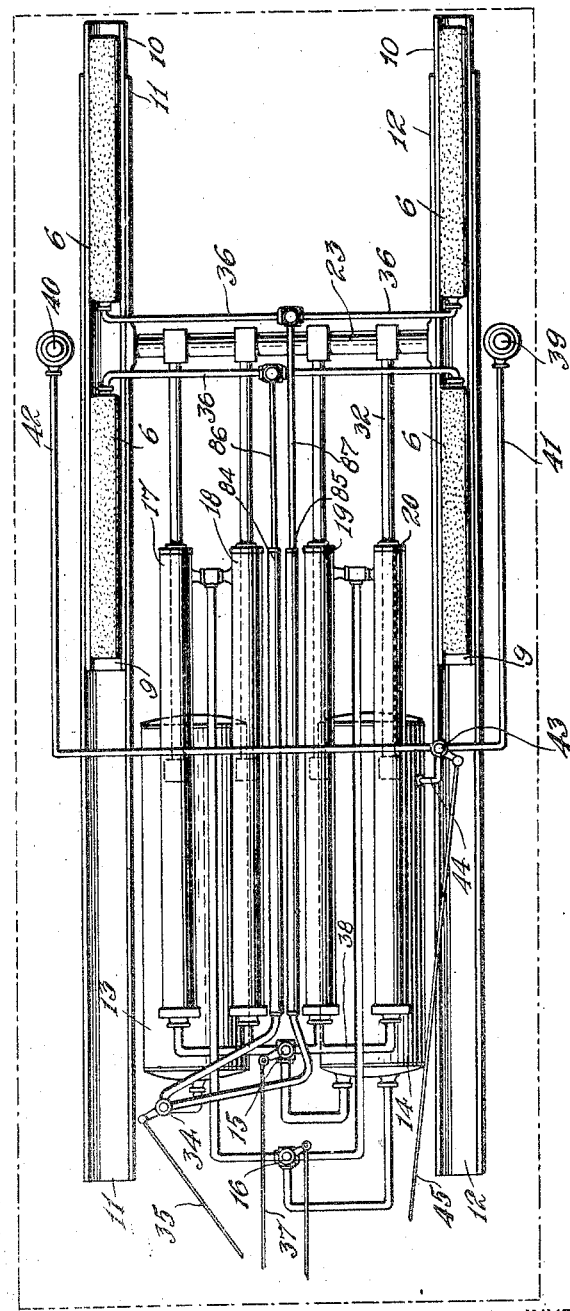

May 10, 1938.　　　N. A. LUDINGTON　　　2,117,067
TRANSPORTATION MEANS
Filed June 8, 1933　　　21 Sheets-Sheet 8
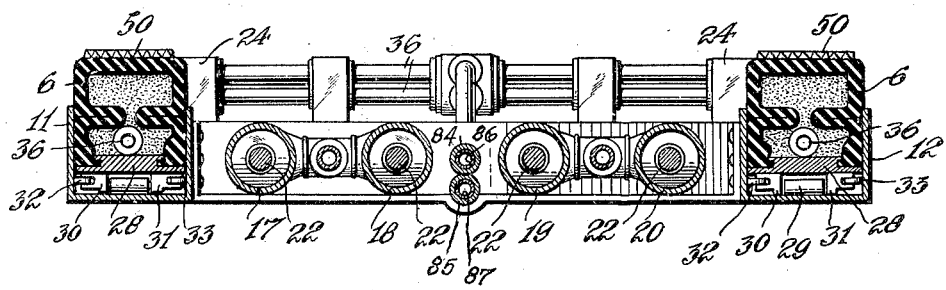
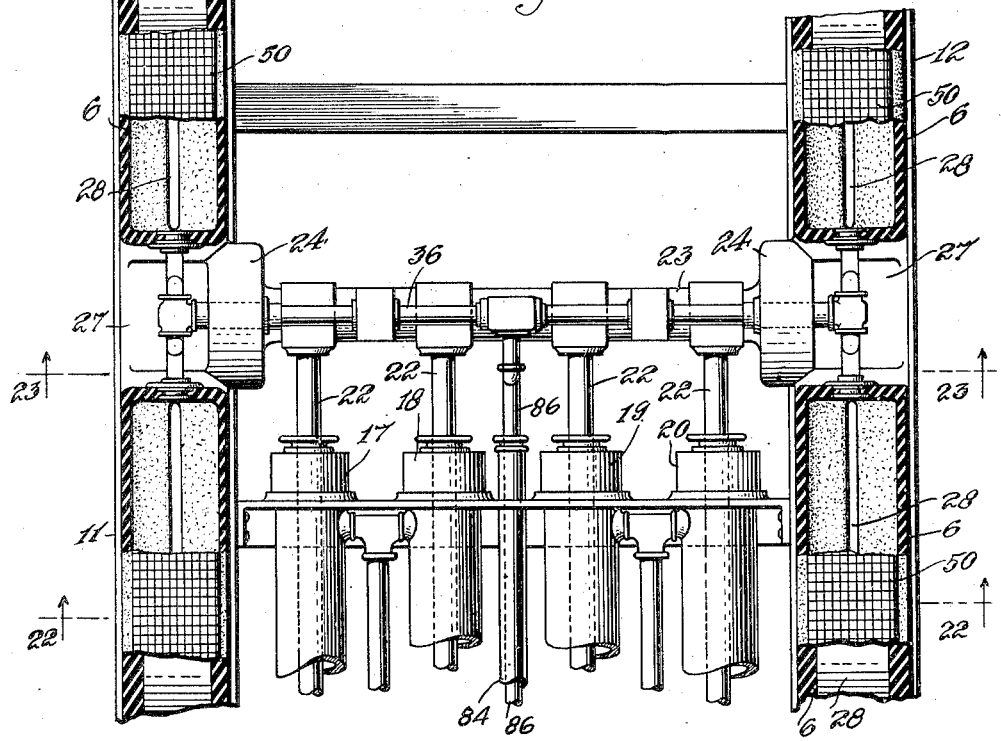
INVENTOR
Nelson A. Ludington
BY
A. D. T. Libby
ATTORNEY

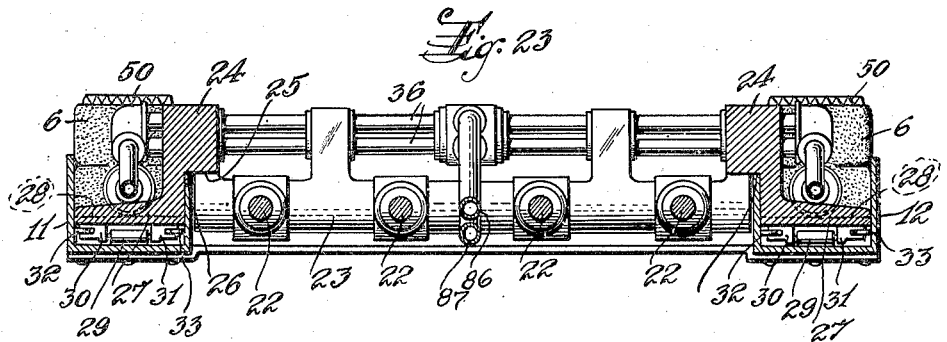
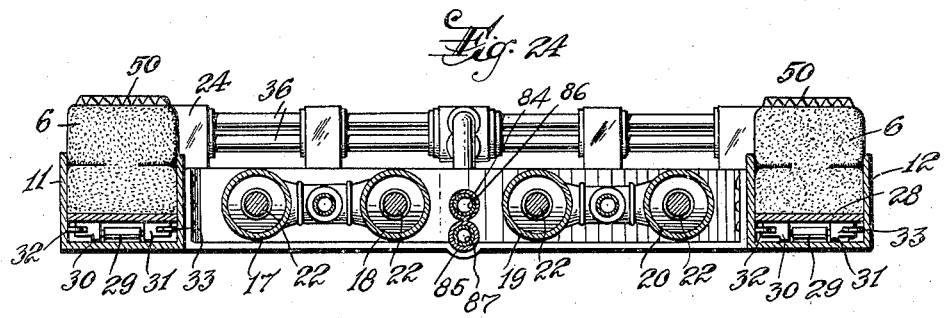
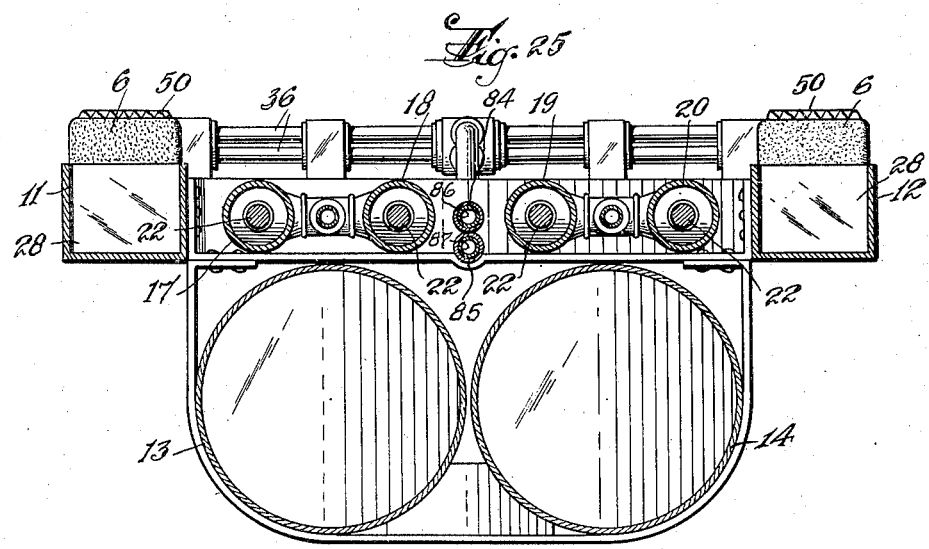

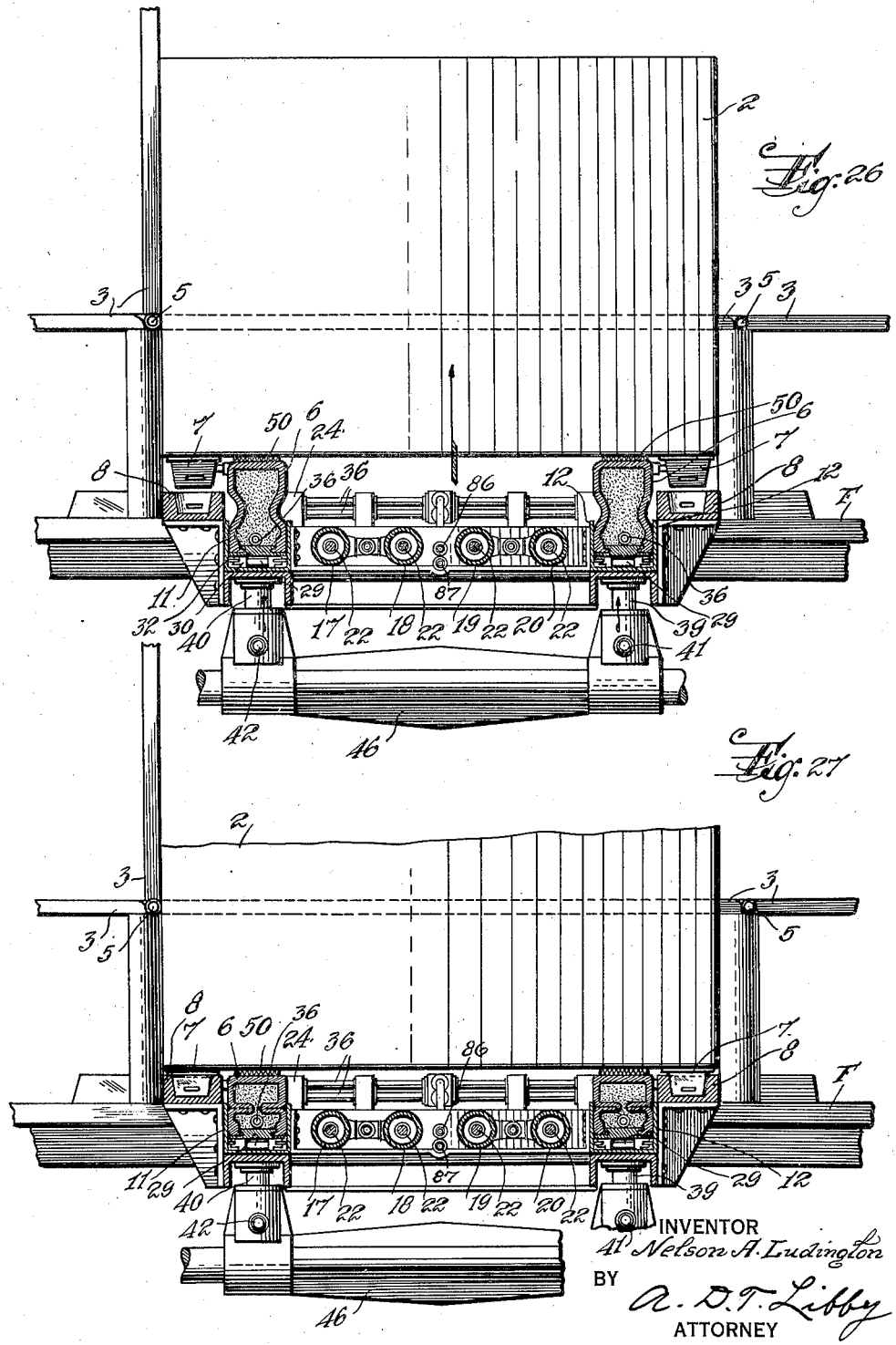

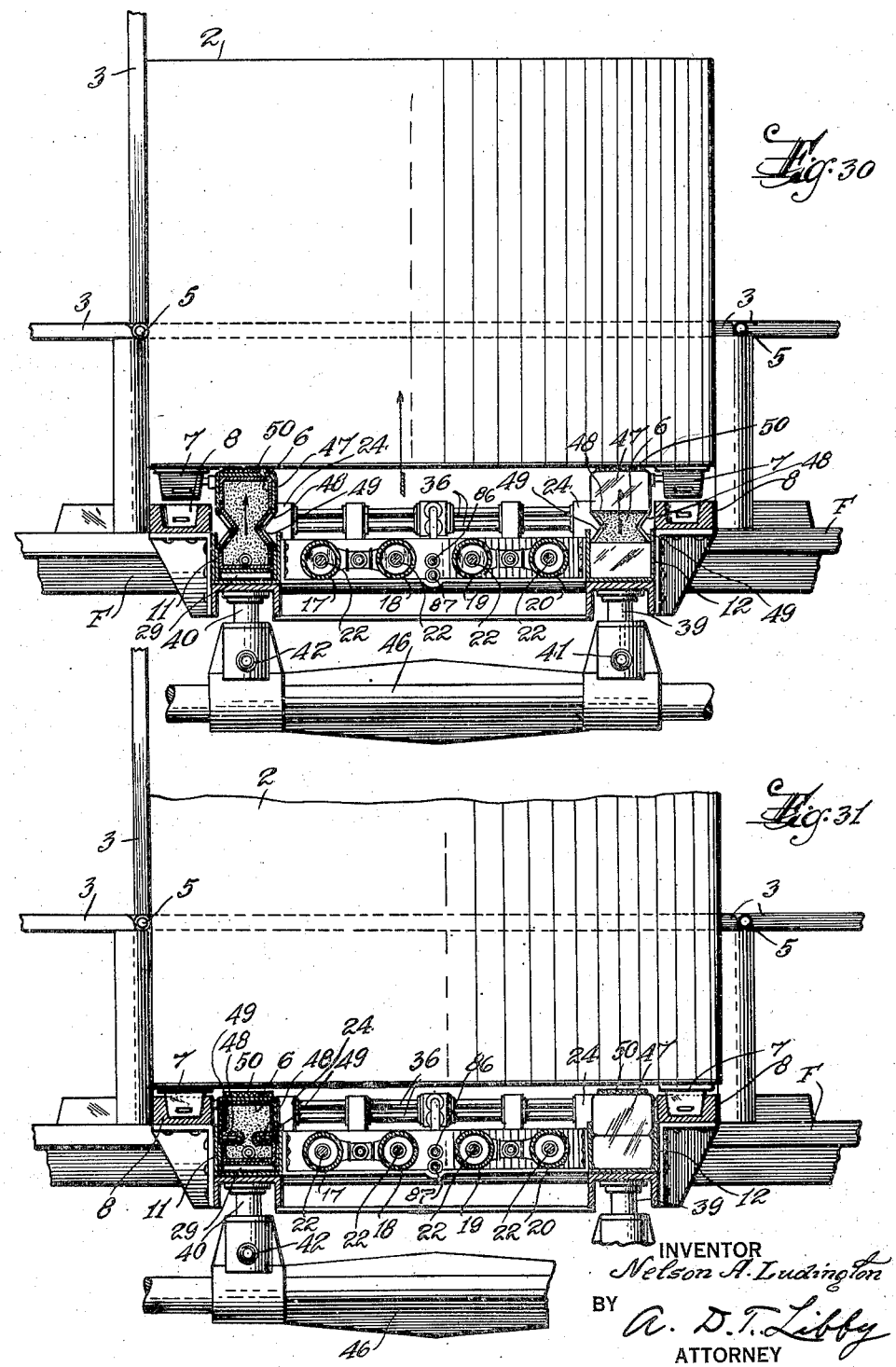

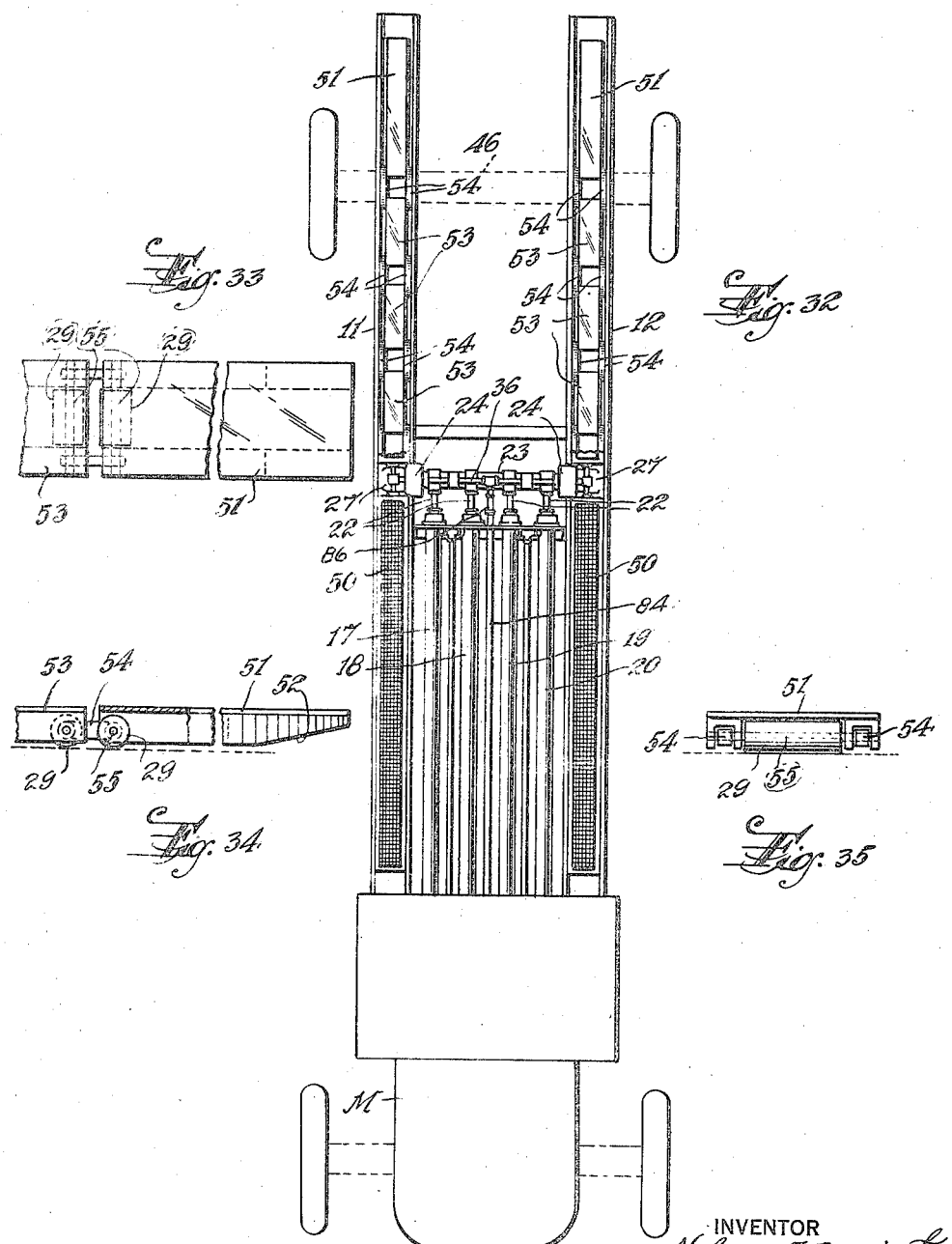

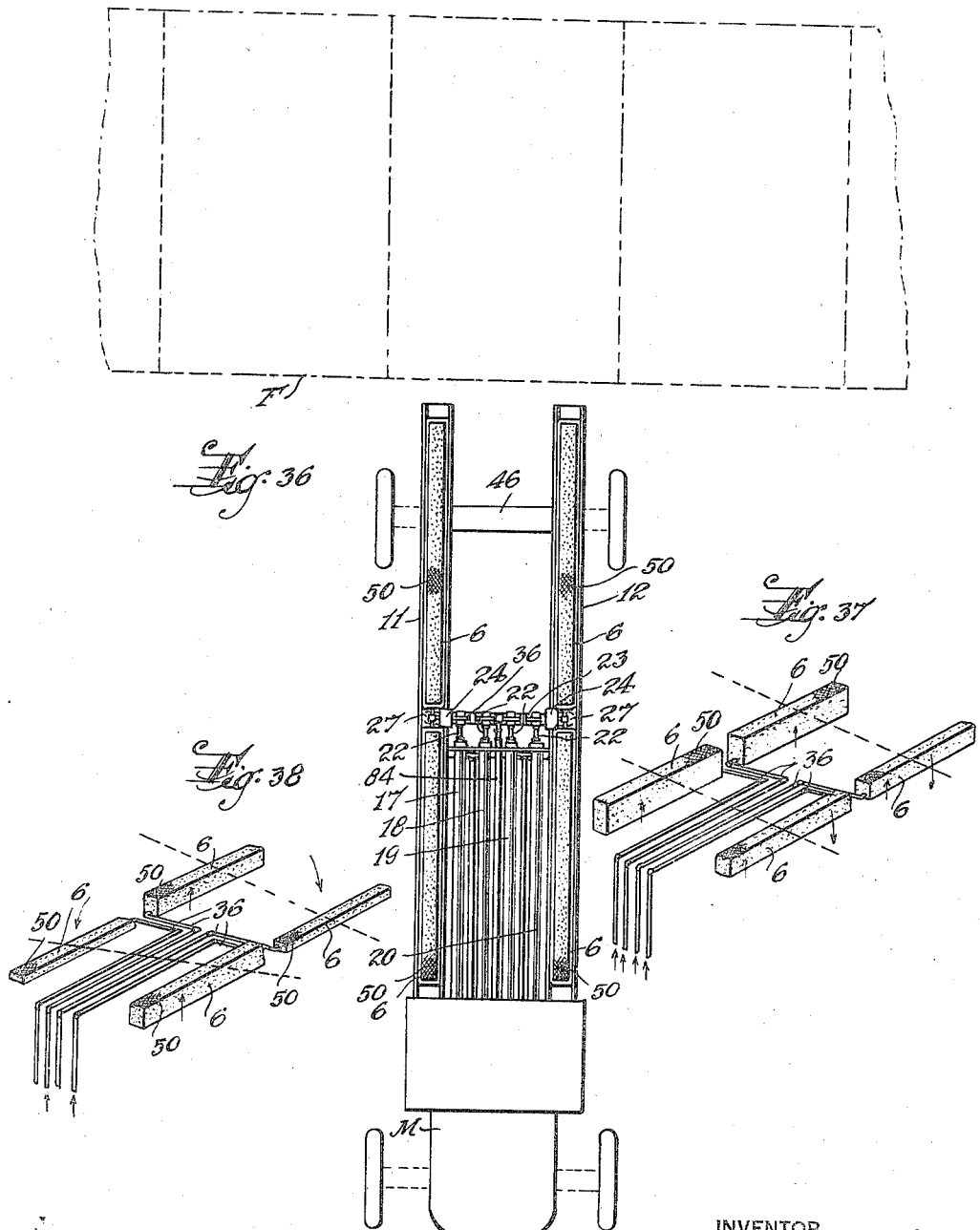

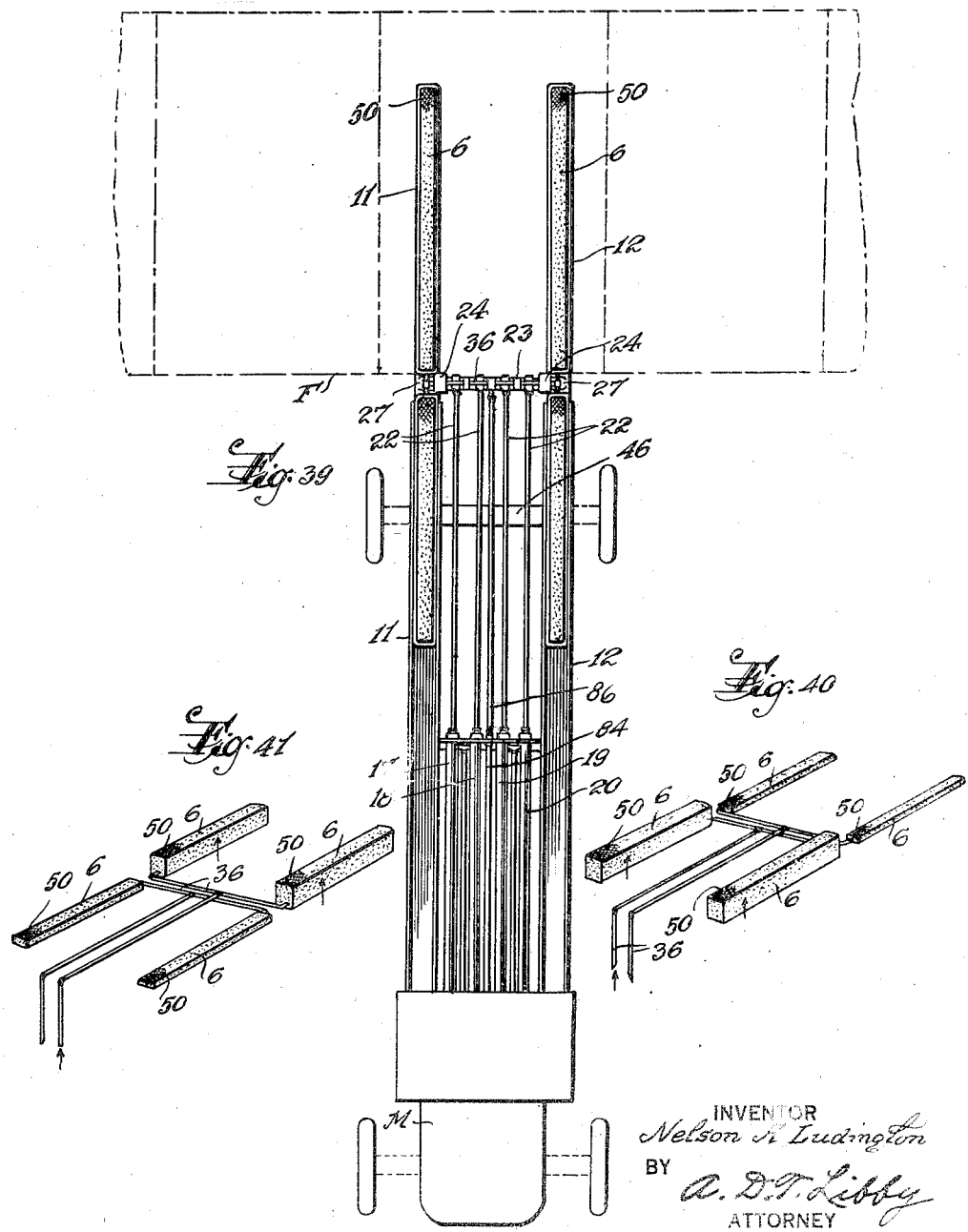

May 10, 1938.    N. A. LUDINGTON    2,117,067
TRANSPORTATION MEANS
Filed June 8, 1933    21 Sheets-Sheet 16
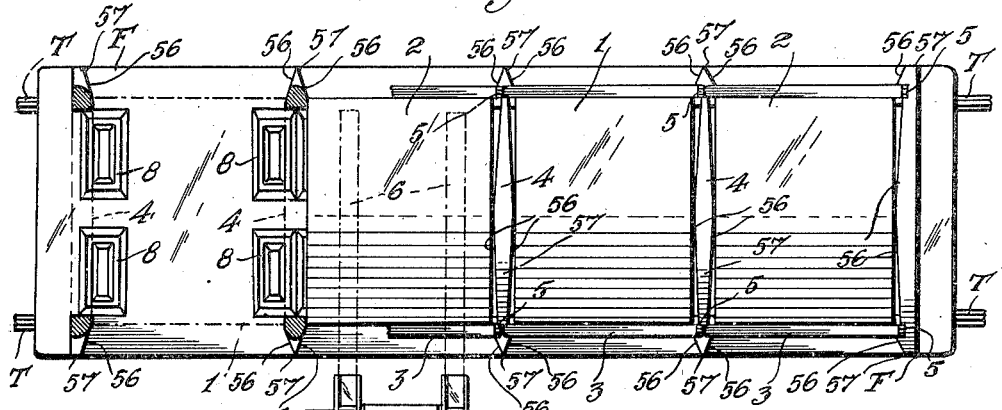
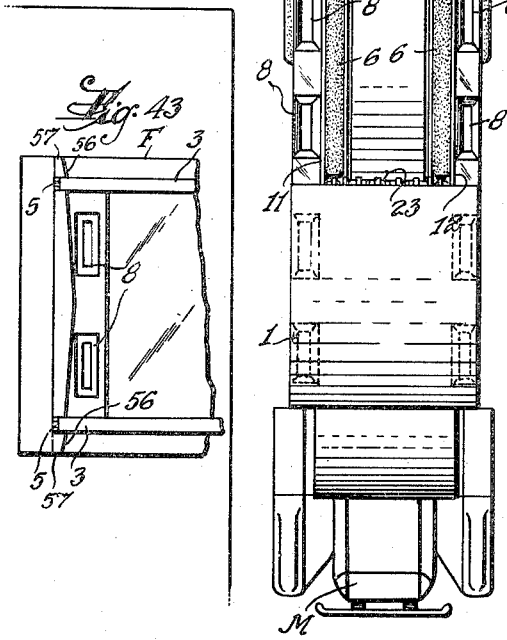
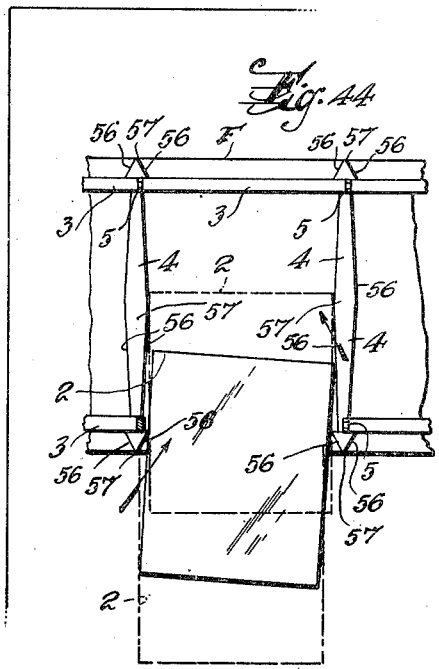
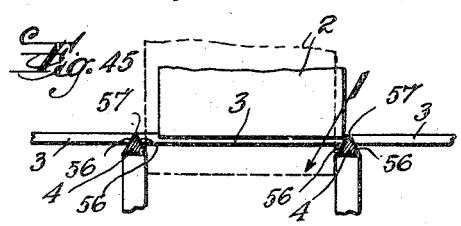
INVENTOR
Nelson A. Ludington
BY
A. D. T. Libby
ATTORNEY

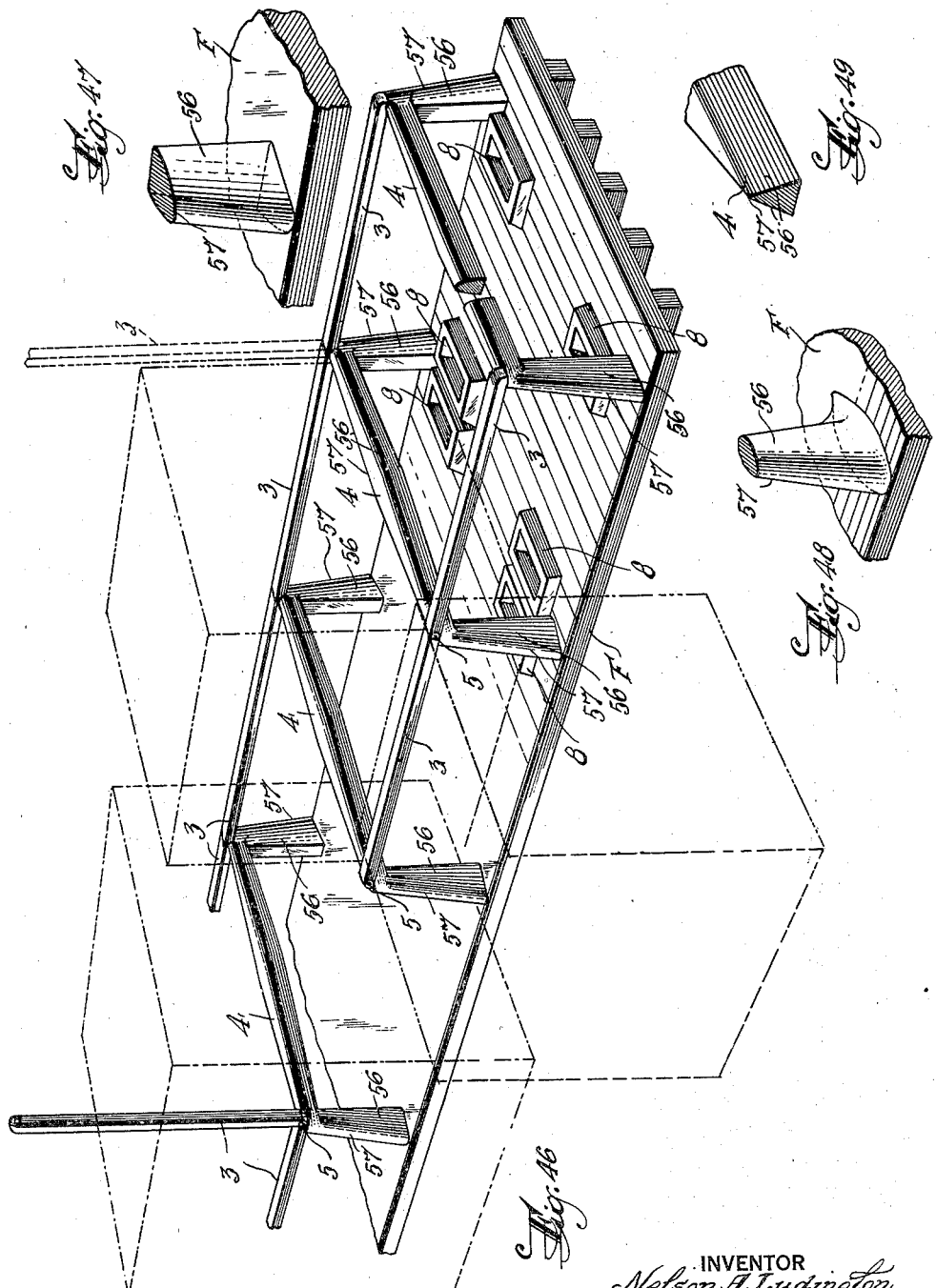

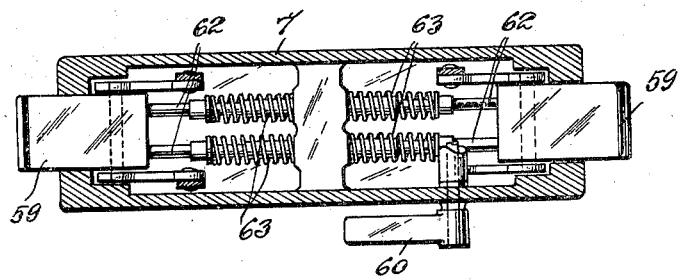
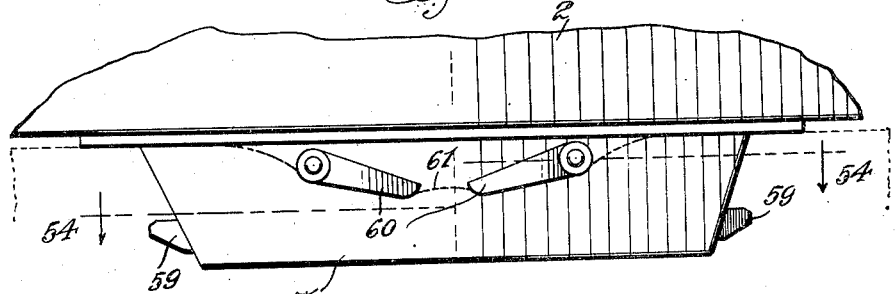
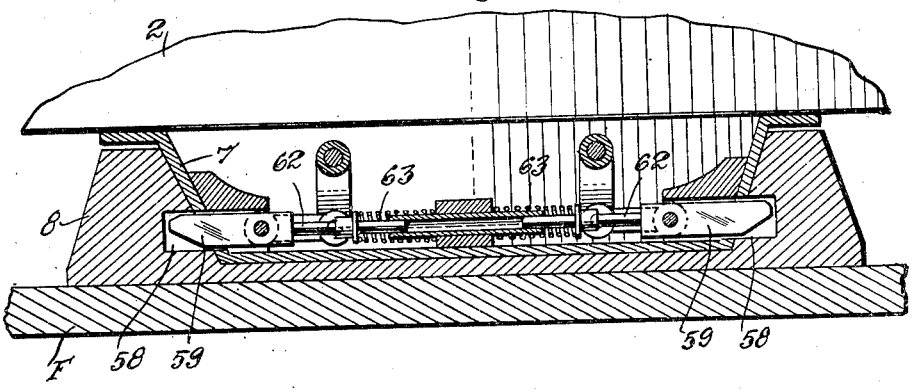

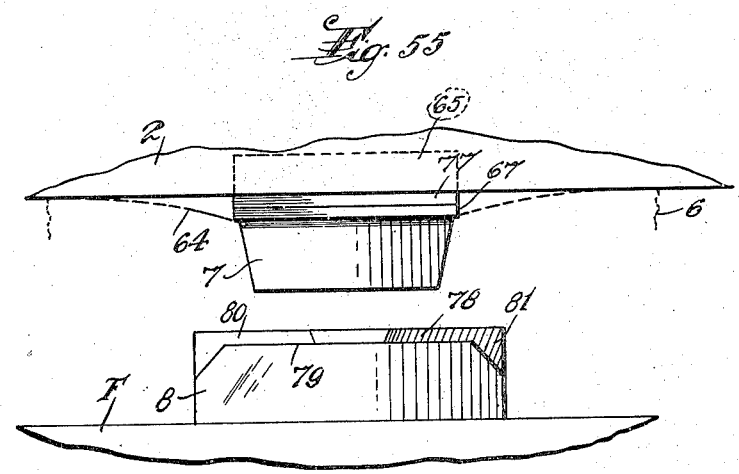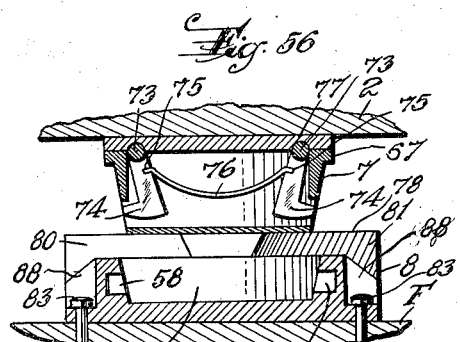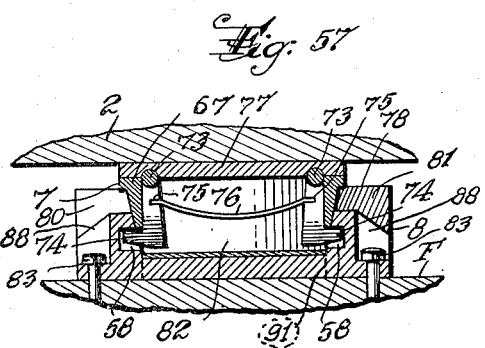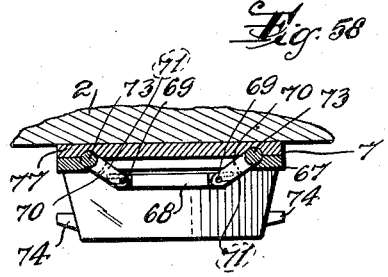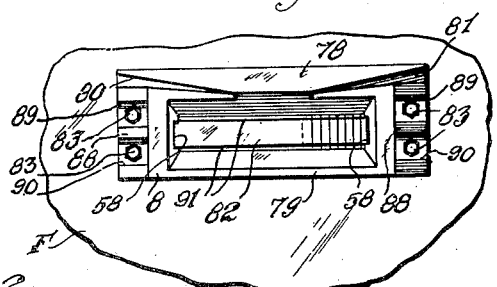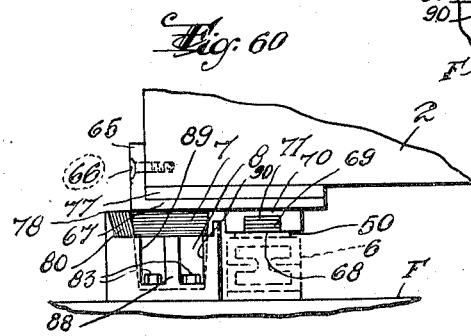

May 10, 1938.  N. A. LUDINGTON  2,117,067
TRANSPORTATION MEANS
Filed June 8, 1933    21 Sheets-Sheet 21
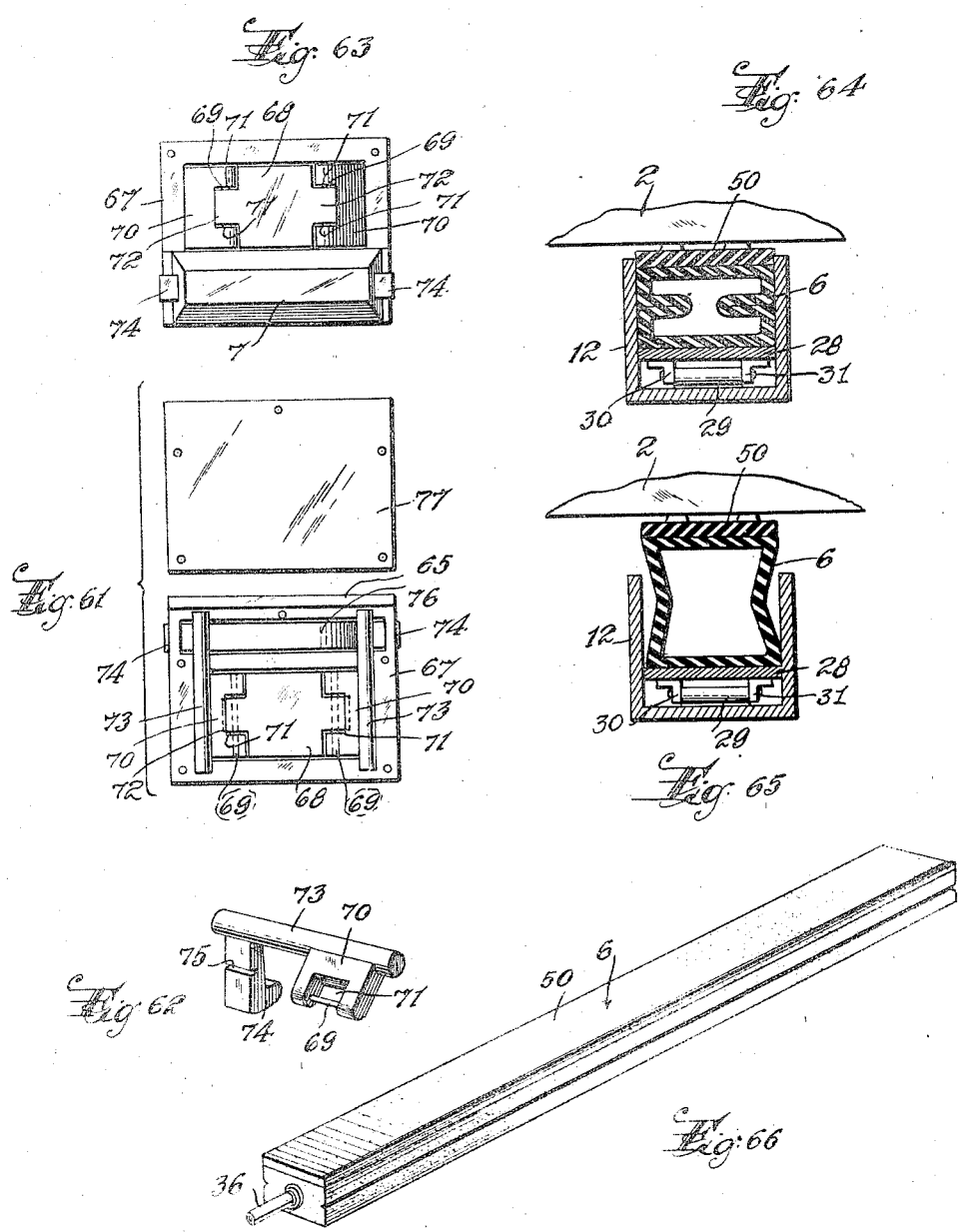
INVENTOR
Nelson A. Ludington
BY
A. D. T. Libby
ATTORNEY Patented May 10, 1938

2,117,067

UNITED STATES PATENT OFFICE 2,117,067

TRANSPORTATION MEANS

Nelson A. Ludington, New Haven, Conn.

Application June 8, 1933, Serial No. 674,785

48 Claims. (Cl. 214—65)

In my patent 1,910,398, issued May 23, 1933, I have shown and described a new and novel means for transporting goods or merchandise, which means includes, as probably the most important unit in the system, a special type of truck which I have referred to in said patent as a turret truck.

My present invention also relates to a further new and novel means for transporting goods or merchandise through a co-ordinating means in which the most important unit in the system is still a truck, but one of an entirely different nature and construction, and having a different mode of operation from the truck of said patent.

The problems which have and still do confront the railway systems in this country, and the need for a co-ordinating unit to work between said railway systems and the public, are fully set forth in my patent above identified, and to avoid repetition thereof, reference is made to said patent.

Briefly then, my present invention is directed to attaining the same objects and advantages as in my prior patent, but through the use of an entirely different design of truck and its associated mechanisms.

My present system of transportation co-ordinating means is set forth in the drawings annexed to this specification, wherein:

Figure 1 is a side elevation of my improved form of truck showing two containers thereon ready to be discharged to a flat car equipped to receive them, the car being shown somewhat diagrammatically and partly in section.

Figure 2 is a view similar to Figure 1 but showing the rear pair of pneumatic elevators inflated, thereby unlocking the box-skids from the truck and raising the box, according to the arrow, ready to be discharged to the flat car.

Figure 3 is a view similar to Figure 2, but showing the rear container being moved in the direction of the arrow toward the flat car, and being guided on to the flat car by means of the guide-rails indicated.

Figure 4 is a view similar to Figure 3 but with the container now about half unloaded from the truck on to the flat car, also being guided by the horizontal rails on the flat car.

Figure 5 is a view similar to Figure 4, but with the container moved completely on to the flat car ready to be lowered into locking position thereon.

Figure 6 is a view similar to Figure 5, but with the pneumatic lift members deflated and the container dropped into locking position, whereby the container's skids are now nested in the resting blocks on the flat car, and the truck sliding members are ready to be withdrawn from under the container.

Figure 7 shows the same truck and two containers of Figure 1, but with both forward and rear pneumatic elevators raised so that both containers are ready to be simultaneously moved to unloading position.

Figure 8 is a view similar to Figure 7 but shows one container moved nearly to final position on the flat car, and the other container simultaneously transferred from the forward part to the rear of the truck.

Figure 9 is a view similar to Figure 8 but with the forward elevators deflated, as indicated by the direction of the arrow, so as to lock the forward container again on the truck, and permit the further manipulation of the rear container independently of the forward container.

Figure 10 is a view similar to Figure 9, but showing the container that was on the rear of the truck now moved to its final transverse location on the flat car, independently of the forward container and ready to be lowered to its final locking position as indicated in Figure 6.

Figure 11 shows a truck similar to Figure 1, but with only one container thereon, and that at the forward part of the truck.

Figure 12 is a view similar to Figure 11, but with the forward pneumatic elevators raised to release the box, as indicated by the arrow, preparatory to moving it to the rear end of the truck for carrying or discharging.

Figure 13 is a view similar to Figure 12, but showing the container carried back to the rear position on the truck, indicating the rear elevator in the deflated position, as there is no container on this rear elevator.

Figure 14 shows the container of Figure 13 lowered in the direction of the arrow on to the truck frame, ready to move the elevators forward in the direction of the arrow so that the rear elevators may be placed beneath the container as indicated in Figure 15.

Figure 15 shows the rear elevator now fully positioned under the container whereby the elevators may be inflated and the container raised and discharged in the same manner as the rear container described in Figures 1 to 6 inclusive.

Figure 16 shows the truck carrying two containers, but with one container in the position of being discharged to a flat car, the type of slide members, however, being flexible instead of rigid as illustrated in the figures previously described (see Figures 13 and 14), and showing how this flexible type of sliding member can adapt itself to take care of differences in level between the truck body and the top of a flat car, or any irregularities in the alignment of the truck and the skid-ways on the flat car.

Figure 17 is a view similar to Figure 16 but showing the container in full position on the flat car, ready to be lowered to locking position thereon.

Figure 18 is a view similar to Figure 17 but with the container on the flat car lowered to locking position thereon.

Figure 19 is a plan view of the mechanism carried by the truck body for operating the slide members and the pneumatic elevators, and also the pneumatic or hydraulic jacks carried on the rear axle.

Figure 20 is a plan view of the forward portion of the mechanism shown in Figure 19, but on a larger scale and showing portions of the air-cylinders broken away, said air-cylinders being used in connection with associated pistons which are indicated for moving the sliding members used for moving the container.

Figure 21 is a part plan and part horizontal sectional view about the central part of the truck, showing the piston cross-head for connecting with the slides, and also showing piping leading to the pneumatic elevators.

Figure 22 is a view on the line 22—22 of Figure 21, showing the fluid-pressure-operated expansible members or elevators in deflated position.

Figure 23 is a view on the line 23—23 of Figure 21, showing the cross-head connected to the slides, and the piston rods connected to the cross-head.

Figure 24 is a view on the line 24—24 of Figure 20.

Figure 25 is an enlarged view on the line 25—25 of Figure 20, showing the compressed-air containers below the pistons.

Figure 26 is a part-elevational and part-sectional view through the frame of the truck, showing the container being raised from the flat car ready to be pulled on to the truck and be dropped into locking position on the truck. This view also shows an auxiliary pneumatic means, comprising a double-acting cylinder, attached to the rear axle of the truck, by which the truck body may be adjusted to variations of level between it and a flat car or loading platform, by which an added stability of the rear end of the truck is established through diminution of normal spring action.

Figure 27 is a view similar to Figure 26, but with the auxiliary elevating means in retracted position, and likewise the pneumatic elevators in deflated position, and showing the container in locked position on the truck.

Figure 28:
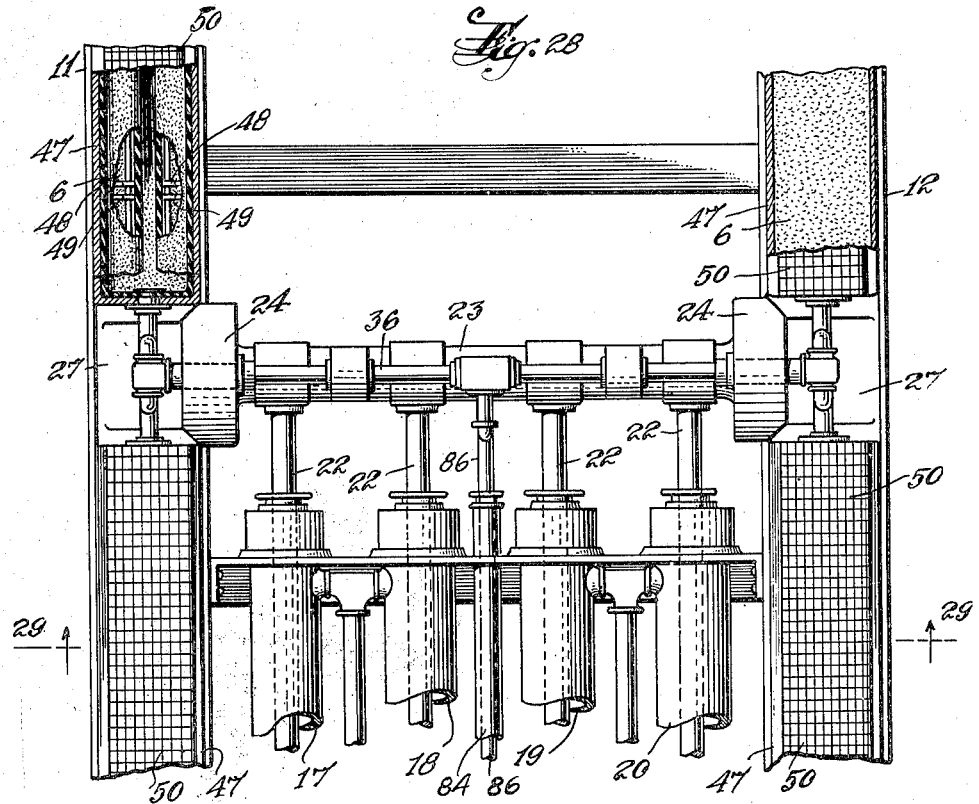

Figure 28 is a view similar to Figure 21, but showing a modified form of elevator, the same having a flexible, metal-clad protecting casing, all or part-way around.

Figure 29:
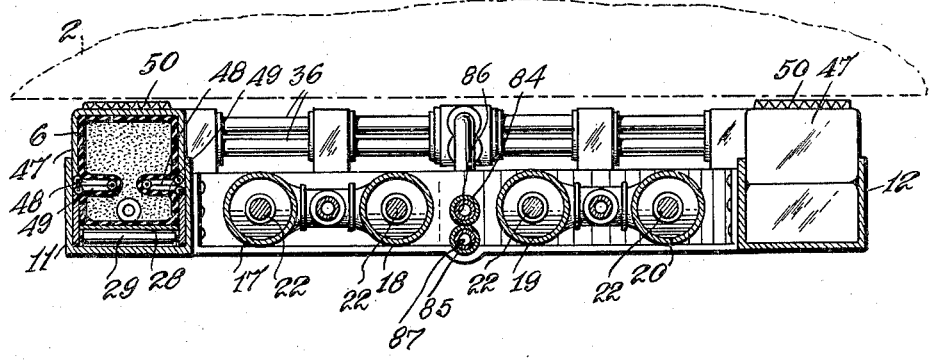

Figure 29 is a view on the line 29—29 of Figure 28.

Figure 30 is a view similar to Figure 26, but showing the modified form of elevators shown in Figures 28 and 29.

Figure 31 is a view similar to Figure 27, but of the form of elevator shown in Figure 30.

Figure 32 is a plan-view of the truck, showing the pneumatic elevators in place on the forward portions of the slide members which are of a rigid type, while the portions to the rear of the cross-head show a segmental or flexible type of slide member, the pneumatic elevators being removed from the slides.

Figure 33 is a plan-view of the rear sections of the flexible slide members shown in Figure 32.

Figure 34 is a side-view of Figure 33.

Figure 35 is an end-view of one of the flexible sections of the slide members showing the roller bearings on which the sections rest.

Figure 36 is a plan-view of the truck similar to Figure 32, but showing both pairs of elevators in place and the truck in the position which it would be to discharge a container on to a portion of the flat car indicated by the dotted line.

Figures 37 and 38 show a form of piping to the elevators making it possible to inflate or deflate, at will, the various elevators for tilting or canting the container unequally in a vertical direction, so as to overcome inequalities of the road on which the truck or car is standing, or being operated.

Figure 39 is a view similar to Figure 36, but with the truck slides extended as they would be when they are unloading or withdrawing a container from the flat car.

Figures 40 and 41 illustrate the normal method of piping, in which the elevators are raised and lowered in pairs.

Figure 42 is a plan-view of a flat car having two containers thereon, and another which has just been discharged from the truck, with the slide members withdrawn on to the truck from the dotted position shown, whereby the truck or the car may be moved to discharge the remaining box on to the remaining space on the car. This figure also shows four resting blocks for receiving the slide blocks on the container.

Figure 43 shows a modified form of resting block all in one piece, but having two receptacles for the container slide blocks.

Figure 44 shows how the container is guided horizontally into position in its space on the car by reason of the rail members.

Figure 45 is somewhat similar to Figure 44, but shows details for guiding the container in a vertical direction.

Figure 46 is a perspective diagrammatical view of the top of the flat car, showing the guide members and one form of the resting blocks which, as indicated, are above the surface of the car, but which may be flush; this figure also showing a plurality of boxes in various positions on or at the car.

Figure 47 is a fragmentary perspective view of one of the guide posts.

Figure 48 is a view similar to Figure 47, but showing a modified form of guide post.

Figure 49 shows a fragmentary section of a modified form of guide-rail.

Figure 50:
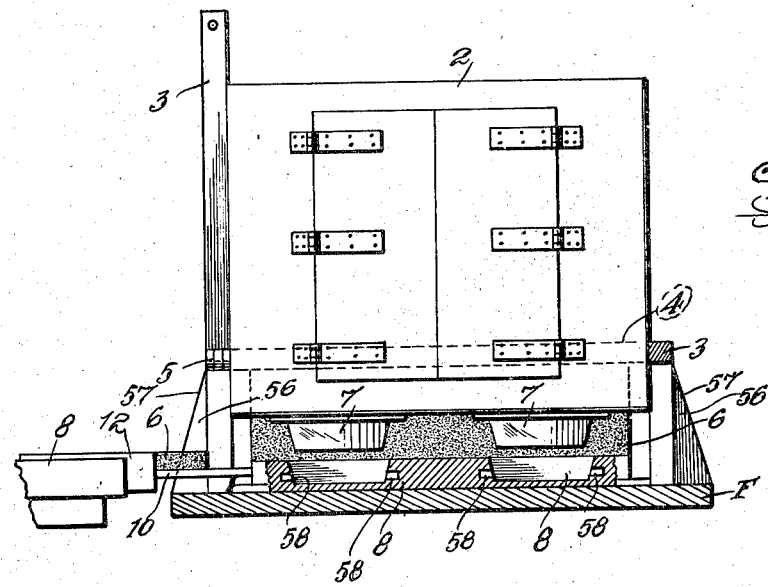

Figure 50 shows a container moved on to the flat car ready to have the elevators deflated so as to bring the container into final locking position on the car.

Figure 51:
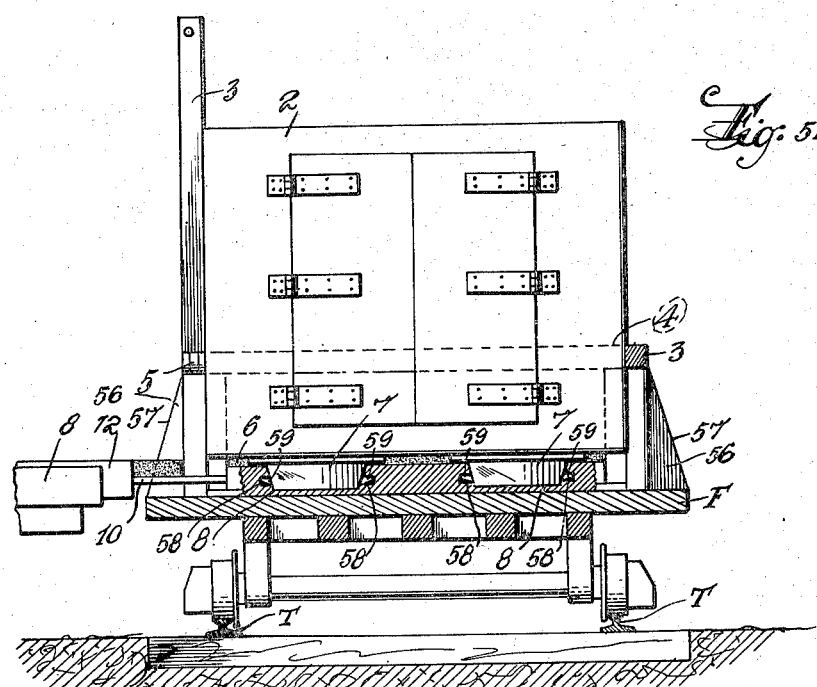

Figure 51 is a view similar to Figure 50, but with the container lowered to its final resting place, and the locks in operative position to hold the container securely on the car.

Figure 52 is a longitudinal sectional view through the car body, the resting blocks, and the locking bolts of the container slide locks in locking position.

Figure 53 is a side elevational view of the container, showing the slide blocks with the locking bars in extended position, as shown in Figure 52.

Figure 54 is a section on the line 54—54 of Figure 53.

Figure 55 is a side-elevation showing a preferred form of locking skids on the box or container and its corresponding receptacle or socket on the flat car just previous to lowering the box so that the skid enters the socket.

Figure 56 is a vertical section through the devices shown in Figure 55, showing the locking dogs in retracted position ready to go into the socket.

Figure 57 is a view similar to Figure 56 but with the box seated and the locking members in locking position.

Figure 58 is a part-sectional and part-elevational view through that part of the box-skid showing the control plate for operating the dogs.

Figure 59 is a top plan-view of the receptacle or socket used on the chassis or on the platform car.

Figure 60 is an end elevation of the box-skid in locked position on the socket of Figure 59, the expander being shown in dotted lines in partly deflated position.

Figure 61 is a top plan-view of the box-skid of Figure 55, but with the cover plate removed.

Figure 62 is a perspective view of one of the locking bolts used on the box-skid.

Figure 63 is a bottom plan-view of the box-skid shown in Figure 55.

Figure 64 shows a sectional view through the expander in position on the chassis, but deflated.

Figure 65 is a view similar to Figure 64 but with the expander in extended or expanded position to raise the box, ready for longitudinal movement.

Figure 66 is a plan-view of one form of one of the expanders or expansible members used for raising and lowering the box or container from the chassis support members.

In the various views of the drawings, wherein like numbers refer to corresponding parts, Figures 1 to 18 inclusive illustrate various conditions of operation of the truck in the process of loading and unloading load-boxes or containers onto or from a flat car or the truck.

In Figure 1, the motor truck M is provided with a chassis, certain of the details of which will be later pointed out. The truck, as indicated, has mounted thereon, two load-boxes or containers carrying goods to be transported. The truck, as shown, is backed alongside a flat car F equipped to receive the type of load-boxes to be later described more in detail. The flat car F is subdivided with rails or partitions constructed so as to assist in guiding the boxes 1 and 2 thereon. As indicated in Figure 1, one of the rail members 3 is raised to open the space or compartment so as to deliver the box 2 into this compartment. It is to be understood that the load-boxes 1 and 2 are securely locked to the chassis of the truck, and therefore the first operation will be to release box 2, at the same time raising it from its locked position, whereby it can be moved longitudinally of the chassis on to the flat car F. Figure 2 shows box 2 so raised.

In Figure 3, a longitudinal movement of the box is being carried out, the box just entering the space provided for it on the platform car F.

In Figure 4, the load-box or container is about half unloaded on to the flat car, being guided into position thereon by the horizontal rails, one of which, 4, is shown.

In Figure 5, the load-box 2 has been moved all the way on to the flat car F and the rail 3, hinged at 5, is ready to be dropped down and fastened into position. Likewise, the expansible members or elevators 6, one of which is shown, are ready to be deflated to lower the box 2 so the box-skids 7, there preferably being four of these to each box or container, will pass into their receptacles or resting blocks 8, corresponding in number to the skids 7 on the flat car F. In the next operation, the elevators or expansible members 6 are deflated and the box 2 is lowered to its resting position on the car F where it is automatically locked as will be later explained.

In Figure 7, both the boxes 1 and 2 are shown raised in a vertical plane by the elevators 6, whereby both boxes can be moved simultaneously longitudinally of the chassis so the box 2 may be delivered to the flat car as shown in Figure 8, and as has been previously explained. The elevators 6 under the box 1 are then deflated, as shown in Figure 9, to put the box 1 in carrying or transporting position on the chassis in locked position.

In Figure 10, the box 2 is shown in full-on position on the flat car and the elevators are ready to be deflated so the truck can be moved to place the box 1 opposite its compartment on the flat car, or the flat car can, of course, be moved along the track T to bring a compartment thereon in line with the box 1.

In Figure 11, the truck is illustrated as having only one container or load-box thereon. To discharge this box from the truck, the box is first raised as shown in Figure 12, and then the carrier is moved back so that the box is in position at the rear of the chassis as indicated in Figure 13. The elevator under the box 1 is then deflated so that the box is in the position shown in Figure 14, whereby the carrier, composed of two substantially rigid portions 9 and 10, is moved forward so that the portion 10, with its elevator 6, is under the box 1 as indicated in Figure 15. This elevator, supported by the carrier member 10, is then inflated or raised and the box discharged as has been described with respect to box 2 in Figure 1 and others following.

In the diagrammatical illustrations of Figures 1 to 15 inclusive, the slide members comprising the two portions of the carrier are both of the rigid type as is clearly shown in Figures 13 and 14. I may, however, make the rear portion flexible in order to accommodate differences in level between the truck chassis and the platform car F onto which the box is to be loaded or unloaded. This flexibility is indicated in Figures 16 to 18 inclusive, wherein the rear portions of the carrier or sliding members are made up of jointed sections which are so arranged that the box can tilt as indicated in Figure 16, or even twist at an angle because the elevator members can twist a certain amount.

The detail mechanism for obtaining the various movements of the box which has been briefly described and diagrammatically illustrated in Figures 1 to 18 inclusive, will now be fully described.

In Figure 19, I have shown, somewhat diagrammatically, a plan-view of that part of the chassis carrying the mechanisms for obtaining the movements of the box on the end of the truck as has been described. The forward end of this mechanism is shown on an enlarged scale in Figure 20. Two channel members 11 and 12 are provided on the chassis. Within the channel members are positioned a plurality of the elevators 6, preferably a pair, one on either side of the chassis, for each of the boxes or containers to be carried on the truck. Preferably the length of the elevators 6 is made to suit the length of the box which is provided with skid-shoes on each side as will be later described.

Between the channel members 11 and 12, are positioned tanks 13 and 14 which are filled with a fluid, under pressure, preferably air, through the medium of the engine driving the truck, or an air-compressor driven by some part of the engine, the details of which, for the purpose of clarity, are not shown in the drawings. While two compressor tanks 13 and 14 are indicated, only one may be used. Associated with the tanks and connected thereto through suitable valves 15 and 16, are cylinders 17, 18, 19, and 20. Within each of the cylinders, there is a piston 21 having piston rod 22 connected to a cross-head 23. Each end of the cross-head 23 is provided with a boss 24 having a notch 25 therein positioned over the inner flange 26 of each of the channel members 11 and 12. Each of the portions 24 terminates in an arm 27 positioned adjacent the bottom part of each of the channels 11 and 12, and securely fastened in any satisfactory manner, as by welding, to slide-plates 28 to which are attached the base portions of the expanding members or elevators 6.

The plates 28 rest on anti-friction bearings preferably in the form of rollers 29 carried in bearing members 30 and 31. Each of the bearing members 30 and 31 also supports disc type rollers 32 and 33 which engage the sides of the channel in which they are positioned. Thus means are provided for moving the rigid slide members or carriers 28 forward and backward in their respective channels carrying the elevators 6, to be later described more in detail, with them.

As will be seen in Figure 19, a three-way valve 34 is operated, for example from the cab of the truck, through the medium of the lever 35 to allow air to pass to either the forward or the rear set of elevators 6. As has been described with reference to Figure 1 and associated figures, the box on the rear of the truck must be moved first, and consequently the rear elevators may preferably be operated independent of the forward elevators, whereby the box over these elevators may be raised, as has been described, by the compressed air expanding the elevators which are normally in the deflated position shown in Figures 22, 27, and others. As will be noted in Figures 22, 27, and others, the side-walls of the elevators 6 are collapsible and, as indicated, are folded back in a re-entrant manner on each other, and the inlet pipe 36 to the air-chamber within the elevator 6 is positioned below this folded portion of the elevator. As the compressed air or fluid is introduced through the pipes 36, the expansible members 6 are moved to a position about as indicated in Figure 26, from which it will be seen that the container 2 is raised so that the skid-shoes 7 are unlocked in a manner to be later explained, from their receptacles or sockets 8 in the initial part of the movement of the expanders to their expanded position. By having a manually controlled valve 34 as described, the speed of operation of the elevators and the height within limits can be very readily controlled.

If it is desired to raise the box 1, the valve 34 is operated so as to move the forward set of elevators 6 through similar piping that has been described with respect to the rear set of elevators. In certain cases, the manner of operating the elevators can be varied considerably as will be later pointed out in connection with the more specific description of the loading and unloading of the box onto the flat car.

Having, for example, raised the box 2, positioned over the rear elevators 6, and it is desired to unload the box from the truck, the valve 15, which is also a three-way valve, is operated by means of the lever 37, allowing the compressed air from, for example the tank 14, to pass by way of the header pipe 38, to the forward end of all of the cylinders 17 to 20 inclusive, thereby acting on the pistons 21 and through their respective connecting rods 22, on the cross-head 23, to the longitudinally movable members 28 to which the cross-head 23 is connected as has been explained, to move these members with their respective elevators 6, and the box thereon to carry the box into its longitudinal position on the flat car. It is to be understood that the pipes 84 and 85, coming from the valve 34, are telescopically fitted with smaller pipes 86 and 87, respectively, through proper stuffing boxes whereby, as the cross-head 23 is moved by the pistons, the pipes 36, connected to the elevators and joined to the pipes 86 and 87, may be carried along with the cross-head 23.

As has been previously described, the elevators 6 are then deflated by operating the valve 34 so as to let the air out of the elevators, and the box is then lowered so the locking shoes 7 enter the sockets 8 on the platform car. The valve 15 is then operated by the lever 37 in opposite direction, whereby the air is released from the forward part of the cylinders 17 to 20 inclusive, and then further movement of the valve 15 in this reverse direction allows air from the tank 14 to pass to the rear end of the cylinders 17 to 20 inclusive, thereby moving the pistons 21 and the connecting cross-head 23, with the slides 28, in reverse direction, or back within the channel members 11 and 12.

The forward elevators 6 are then operated to raise the box 1 and, followed by the operation of the valve 15 as previously described, to move the slide members and the box carried thereby to the rear of the truck as has been explained.

There is shown on Figure 19, by the numbers 39 and 40, a pair of jacks preferably operated pneumatically through pipes 41 and 42 connected to a valve 43 which in turn is connected to the tank 14 by a supply pipe 44, the valve being operated by a rod 45 to pass air to the jacks 39 and 40. These jacks, as shown in Figures 26 and 27, are mounted on the rear axle 46 of the truck and are preferably placed so as to be directly underneath the channels 11 and 12 that carry the elevators 6 and their respective slides. In Figure 19, however, the jacks 39 and 40, for the purpose of clarity, are shown as positioned on either side of the channels 11 and 12 and they may be so arranged on the axle 46 if desired. The object of these jacks is so that the load on the frame members of the truck chassis may be taken off the springs, if desired, during the time of loading and unloading so that any bouncing of the boxes will be taken on the elevators and jacks and not on the springs, thereby preserving a better vertical alignment at all times with the flat car onto which the boxes may be unloaded or withdrawn.

In Figures 28 to 31 inclusive, I have shown a modified form of pneumatic elevator. In Figures 26 and 27 the elevator casing, preferably of re-enforced rubber or rubberlike material as will be later described, is shown attached to the slide members 28 by what may be termed a clincher method; whereas in Figures 29 and 31, the elevator 6 is more or less enclosed in a metallic casing 47, the two portions of which are connected by jointed sections 48 and 49 which are positioned within the folds of the casing as shown in Figure 29, but adapted to be extended with the elevators 6 as shown in Figure 30.

It will be obvious by reference to Figures 26 to 31 inclusive that the elevators must be provided with such a fold as indicated, or an equivalent thereof, in order to allow for the vertical expansion of the elevators to raise the boxes as has been described. Preferably, it may be also noted at this point, that the elevators are provided with a roughened or irregular tread or gripping surface 50 for engaging the bottom of the boxes. In Figure 29, the rollers 29 are somewhat differently mounted than in Figure 22, they being pivoted on the bottom part of the casing which surrounds the lower portion of the elevators 6.

In the diagrammatic views of Figures 16, 17, and 18, I have shown the rear portions of the slide members as being flexible. This construction is shown more in detail in Figures 32 to 35 inclusive, wherein these rear portions of the slides are made up of jointed sections, the extreme end one, 51, of each slide being tapered at 52 for assisting in moving the slides under a box on a platform or flat car for loading on the truck, or for guiding the slides on to the car for unloading. The end sections 51 are connected to the other sections 53 by links 54, much the same as in an endless chain, the link pivot pins 55 also acting as supports for the roller bearings 29.

Referring now more in detail to the flat car end of my transportation means, I have shown diagrammatically in Figures 36 to 41 inclusive, the truck backed up to a flat car as it would be in the position of delivering a box thereto or taking one therefrom. The boxes are shown removed from the truck as well as other mechanism, showing the elevators 6 in position. If one side of the truck is standing on ground that is a trifle higher than the other side, the elevators on the low side of the truck may be inflated or raised more than the elevators on the opposite side so as to get the box in proper horizontal position with respect to the flat car or platform. This is indicated diagrammatically in Figure 37. Or, if for some reason, it may be necessary to tilt box 2 in one direction and box 1 in the other, this can be done as indicated in Figure 38, it being assumed in both cases that the elevators are piped and supplied with control valves to give this operation.

In Figure 39, the carrier slides have been moved back to the position to discharge the box on the platform or flat car, after which the rear elevators are deflated as shown in Figure 40, followed by the deflation of the forward elevators and the withdrawal of the carrier on the truck, so as to bring the rear elevators under the box with the forward elevators deflated as shown in Figure 41.

The platform car may be and preferably is divided into spaces as shown in Figures 36 and 39, and these spaces are more particularly defined by the posts 56 fastened to the platform F. The edges of the posts 56, toward the outer edges of the car, are preferably rounded at 57 to assist in guiding the box into position on the platform between the cross-horizontal rails 4, it being understood that one of the end-rails 3, hinged at 5, is turned to open position to allow the box to enter its space on the platform.

As will be seen from Figure 44, the cross-horizontal rails 4 are preferably tapered from the center toward the edge rails 3. This tapered portion, together with the rounded edges 57 of the posts 56 (see also Fig. 45), assists in guiding the box into position. Because of the ability of the elevators, which are supporting the box when it is being moved onto the flat car, to twist, the box will readily conform to the positions indicated in Figure 44, whereby it can readily align itself in proper transverse position on the flat car as indicated in Figure 42, which shows two compartments filled with boxes and the third just being filled, with the slides of the truck ready to be withdrawn to move box 1 into the last compartment shown at the left of the car.

The receptacles or sockets 8, as shown in Figures 42 and 46, are shown as individual pieces which are preferably of metal, and while they are indicated as extending above the surface of the platform, they may be made so as to come flush therewith, but when set flush, there must be a cross-channel in the platform of the car to allow the slides, carrying the elevators, to pass under that portion of the skids carrying the latches controlling the locking dogs to be later described; or, in the alternative, the skids must be constructed and positioned so as to permit of the introduction, beneath the box, of suitable lifting mechanism. Furthermore, instead of being made as individual sockets, they may be arranged as an integral unit in transverse pairs as indicated in Figure 43 and as shown in the diagrammatical drawings, Figures 1 to 18 inclusive. The posts 56 may be made in the form shown in Figure 48, and the guide rails may also have the form as indicated in Figure 49, in which the one edge is beveled as well as being tapered from the center to the edge of the car.

The form of box-skids and cooperating car or platform sockets for the skids so far illustrated and described, is shown more in detail in Figures 50 to 54 inclusive.

In Figure 50, one of the boxes, for example 2, is indicated as being in position on the flat car, ready to have the elevators deflated to lower the box so the skids 7 will enter the sockets 8. The sockets 8 are provided with notches 58 to automatically receive dogs 59 (see Fig. 52) carried by the box-skids 7. On deflation of the elevators, the box is lowered so that the skids enter the sockets as has been described and as soon as the elevator is released from the latches 60, the spring 63 moves the dogs 59 to the locking position shown in Figure 52, whereby the box is securely locked on the flat car.

In removing the box from the car, the initial upward movement of the elevators 6, assuming they are extended from the truck so as to be under the box, causes the upper surface 50 thereof to engage the latches 60 along the line 61 (see Fig. 53) positioned on the side of the skids 7 and connected to the dog-bolts 62. As the elevators are further raised, the latches 60 are moved upwardly, drawing the dogs 59 inwardly within the skid against the compression of springs 63, thereby unlocking the skid—which applies to all of them on one box—from a cooperating socket on the truck, and raising the box, whereby the longitudinal slides may be operated to draw the box off the car as has been described.

I have shown in Figures 55 to 63 inclusive, a modified form and perhaps preferable type of skid-shoe for the boxes, and resting socket for the truck and platform car. In this form of skid and socket, the top surface of the elevator is indicated by the dotted line 64 (see Fig. 55)

whereby the locking dogs are retracted and do not show as the box is ready to be lowered, so the skid 7 will enter the receptacle 8, the side view of which is indicated in Figure 55.

These parts are better indicated in Figure 60 which shows the skid 7 having a flange 65 extending over one edge of the box and fastened thereto by any suitable means as by screws or bolts 66. The skid 7 also has an extending edge 67 which is cut out to receive a latch-plate 68 pivotally carried on pins 69 on the latches 70. The latches 70 are notched out at 71 to receive the lugs 72 forming part of the latch-plate 68.

The latches 70 are preferably integral with the latch-bolts 73, the ends of which lie in recesses in the top part of the extending edge 67. The latch-bolt 73 carries a dog 74 corresponding to the dog 59 shown in Figure 52, but of a different form. The dog 74 has a slot 75 therein to receive a spring 76, the other end of which engages the corresponding dog on the opposite end of the skid. The dogs 74, with the spring 76, are positioned within what may be termed the runner part 7 of the skid, to one side of the latch-plate as indicated in Figure 60. The two latch-bolts 73, with their latches and dogs are held in position on the extended part 67 by a cover plate 77.

When the skid is in locked position, the spring 76 holds the dog 74 in the sockets or notches 58 within the socket member 8, being released therefrom by reason of the elevators 6 engaging the latch-plate 68, carrying it upwardly and turning the latches 70, latch-bolts 73, and the dogs 74 to releasing position, after which the box is raised by the elevators. As shown in Figure 60, the elevator 6 is indicated just about to contact with the latch-plate 68.

In the form of socket shown in Figure 59, one edge, 78, extends a short distance above the other edge, 79, and has two tapered surfaces 80 and 81 to assist in guiding the box into position over the opening 82 in the socket. The socket may be held to the platform or framework of the car in any suitable manner as by means of screws or bolts 83. The guide and stop members 88 prevent the skids from entering the space between the edges 89 and 90, and assist in guiding the skid over the end of the socket. This type of socket may also be mounted so that the edge 79 is flush with the platform, whereas the edge 78 must extend above the platform in order to get the guiding effect of the tapered or beveled surfaces 80 and 81. The sockets are preferably provided with one or more slots 91 for drainage.

Throughout the specification, I have illustrated different types of elevators, indicating that these may be made differently and attached to the slide or longitudinally movable members in several ways, and while I propose to file a separate application on these and other various forms, I have chosen to illustrate herein, more particularly one form which I have found by tests, to be satisfactory for the purpose. This form is illustrated perspectively in Figure 66, the cross-sections of which are shown in Figures 64 and 65 in deflated and inflated positions, respectively, it being understood that in this form, the expander 6 is made of rubber suitably reenforced, somewhat as in a vehicle tire, the reenforcements, however, not being indicated in the different views.

From the somewhat radical nature of this invention, it naturally follows that the details for carrying the invention into practice may be varied over wide limits, without departing from the spirit of the invention or the scope of the appended claims.

Having thus described my invention, what I claim is:

1. Transportation means including an automotive vehicle having a plurality of longitudinally extending channel-shaped members for carrying a load-box; mechanism comprising pneumatically operable apparatus carried by said channels for moving the load-box in a vertical plane, and pneumatically operated mechanism carried by the vehicle for actuating said first-mentioned mechanism and to move the box longitudinally of the vehicle.

2. Transportation means including an automotive vehicle having a chassis including a plurality of longitudinally extending channel-shaped members, means for carrying a load-box on the chassis; mechanism, part of which is pneumatically operable, positioned within the channels for first moving said load-box in a vertical plane, and mechansm carried by the chassis and pneumatically operated for acting on certain parts of the mechanism within the channels to move said load-box longitudinally off or onto the truck.

3. Transportation means including an automotive vehicle having a chassis including a plurality of longitudinally extending channel-shaped members, means for carrying a load-box on the chassis; longitudinally movable members carried within the channels, expansible members, adapted to be operated by fluid under pressure, carried by said longitudinally movable members, means for applying fluid under pressure to said expansible members to raise said box from the chassis, and mechanism carried by the chassis and adapted to be operated by fluid under pressure to move said longitudinally movable members in a longitudinal direction.

4. Transportation means including an automotive vehicle having a chassis including a pair of longitudinally extending channel-shaped members, means for carrying a load-box on the chassis; means for locking said box on the chassis, longitudinally movable members carried within the channels, expansible members, adapted to be operated by fluid under pressure, carried by said longitudinally movable members, means for applying fluid under pressure to said expansible members to move said locking means to releasing position and raise said box from the chassis, and mechanism carried by the chassis and adapted to be operated by fluid under pressure to move said longitudinally movable members in a longitudinal direction.

5. Transportation means as set forth in claim 3, further characterized by fluid-pressure means for raising and lowering the rear end of the chassis as and for the purpose described.

6. Transportation means as set forth in claim 3, further characterized in that said expansible members are of reinforced rubber, the side wall thereof having re-entrant folds normally lying together as and for the purpose described.

7. Transportation means as set forth in claim 3, further characterized in that said expansible members are of reinforced rubber, the side wall thereof having re-entrant folds normally lying together as and for the purpose described, and further characterized in that the side wall of the expansible member is reinforced by a flexible metallic casing.

8. Transportation means as set forth in claim 3, further characterized in that the longitudinally movable members in each channel are formed of forward and rear parts connected to a cross-head and fluid pressure means for operating said cross-head.

9. Transportation means as set forth in claim 3, further characterized in that the longitudinally movable members in each channel are formed of forward and rear parts connected to a cross-head and fluid pressure means for operating said cross-head and further characterized in said rear parts being made up of jointed sections as and for the purposes described.

10. Transportation means as set forth in claim 3, further characterized in that the longitudinally movable members in each channel are formed of forward and rear parts, the said chassis mechanism operated by fluid including cylinders and pistons, the pistons having rods connected to a cross-head and the cross-head being connected at the junction of said forward and rear parts within the channels.

11. Transportation means including an automotive vehicle having a chassis, means for carrying a load-box thereon, fluid-pressure-operated expanders for engaging the box and lifting it vertically from the chassis, means for passing fluid under pressure to said expanders, longitudinally movable members attached to said expanders, mechanism carried by the vehicle and connected to said movable members and having parts, fluid-pressure-operated, to move said movable members longitudinally as and for the purpose described.

12. Transportation means including an automotive vehicle having a chassis, means for carrying a plurality of load-boxes thereon, expanders arranged on opposite sides of the chassis and in forward and rear sets under said boxes, means for passing fluid under pressure to said expanders, longitudinally movable members carrying said expanders, mechanism carried by the vehicle and connected to said movable members and having parts, fluid-pressure-operated, to move said movable members longitudinally of the chassis for the purposes described.

13. Transportation means as set forth in claim 12, further characterized by means for operating said expanders either singly or in any desired combination.

14. Transportation means as set forth in claim 11, further characterized in that the load-box is provided with skid blocks and the chassis is provided with sockets to receive said skid blocks, said skids and sockets having means which act automatically to lock the box in place on the chassis when the box is placed in carrying position thereon.

15. Transportation means as set forth in claim 11, further characterized in that the load-box is provided with skids and the chassis is provided with sockets to receive said skids, said skids and sockets having parts which act automatically to lock the box in place on the chassis when the box is placed in carrying position thereon, and means for unlocking the box from the chassis sockets by and during the initial movement of the expanders to expanding position.

16. A transportation unit comprising, a truck having a chassis to receive a load-box, compressed air-tanks and cylinders carried by the chassis with means for compressing air in said tanks and passing it to said cylinders, pistons within said cylinders and having rods extending therefrom, flexible air-chambers disposed on opposite sides of the chassis, means for passing air from said tanks to said air-chambers to expand them to move the box in a vertical direction, longitudinally movable carriers for said chambers and supports therefor, and means for connecting said piston rods to said carriers.

17. A transportation unit as set forth in claim 16, further characterized by the chassis having side-channels to receive said air-chambers, and anti-friction bearings for movably supporting the carriers on the bottoms of the channels.

18. A transportation unit as set forth in claim 16, further characterized by the chassis having side-channels to receive said air-chambers, and anti-friction bearings for movably supporting the carriers on the bottoms of the channels, and said air-chambers being formed of elongated polygonally-shaped expansible tubes.

19. A transportation unit as set forth in claim 16, further characterized by the chassis having side-channels to receive said air-chambers, anti-friction bearings for supporting said carriers on the bottom of the channels, said air-chambers being formed of elongated tubes of rubber having foldable side-walls, and a substantially rigid box-engaging surface between said walls.

20. A transportation unit as set forth in claim 16, characterized by the chassis and load-box having cooperating means for automatically locking the box in place on the chassis when the box is in transporting position and to automatically release the box prior to its movement in a vertical direction from the chassis.

21. A transportation unit as set forth in claim 16, characterized by the chassis and load-box having cooperating means for automatically locking the box in place on the chassis when the box is in transporting position, and to automatically release the box when it is desired to move the box in a vertical direction from the chassis, said releasing being accomplished directly by the initial expansion of said air-chamber.

22. Transportation means including a truck having a chassis and at least one load-box, said box being provided with skids, sockets on the chassis to receive the skids, means carried by the skids for locking them to the sockets, and means for automatically locking said skids as they are moved thereinto.

23. Transportation means including a truck having a chassis and at least one load-box, said box being provided with skids, sockets on the chassis to receive the skids, and automatically operating means carried by the skids for locking them to the sockets as the skids are moved thereinto, and chassis carrying mechanism expansible under the box to release said locking means and movable to carry the box off the truck.

24. Transportation means including a truck having a chassis and at least one load-box, said box being provided with skids, sockets on the chassis to receive the skids, and automatically operating means carried by the skids for locking them to the sockets as the skids are moved thereinto, and chassis carrying mechanism constructed and arranged for releasing said locking means, raising the box so the skids clear the sockets and moving the box off the truck.

25. Transportation means including a load-box having a plurality of skids on the bottom thereof, said skids adapted to fit cooperating parts on a structure made to receive the box, locking means carried by said skids for locking the same automatically to said parts when the box with skids is placed thereon, and means for moving said locking means into unlocked position and for then raising the box.

26. Transportation means including a load-box, a plurality of devices on the bottom thereof for supporting the box, cooperating parts on a structure made to receive the box shaped to receive and fit said supporting devices, locking means carried by said devices for locking the box automatically to said cooperating parts when the box with said devices is placed thereon, and means carried by the box receiving structure for moving said locking means to unlocked position.

27. Transportation means including a load-box as set forth in claim 25, further characterized in that said skids have locking dogs projecting from opposite ends thereof and at least one latch member for operating said dogs positioned to be in the path of movement of means used for raising and moving said box.

28. Transportation means including a load-box as set forth in claim 25, further characterized in that said skids have a hollow portion with dogs positioned therein and extending through the end walls of the skid, a ledge extending from said hollow portion and carrying a latch member mechanically connected to said dogs for operation thereof, said latch member being normally held below the under surface of said ledge, whereby means inserted under the ledge for raising the box will first move the latch to move the dogs to unlocked position so the box can be moved.

29. Transportation means including in combination, a box of relatively large capacity to receive a quantity of merchandise, a truck having a plurality of spaced longitudinally extending channels having means for receiving said box thereon, pneumatically operable members positioned within said channels for raising said box, and pneumatically operable means for moving said members lengthwise of said channels to carry the box off the truck to a structure made to receive it.

30. Transportation means as set forth in claim 29, further characterized in that said structure made to receive the box is equipped with devices similar to said channel-receiving means, said channel-receiving means and said structure cooperating means having automatically interlocking parts whereby the box is securely locked to said structure.

31. Transportation means as set forth in claim 29, further characterized in that said structure made to receive the box is equipped with devices similar to said channel-receiving means, said channel-receiving means and said structure cooperating means having automatically interlocking parts whereby the box is securely locked to said structure, said pneumatically operable mechanism being adapted for extension under said box on said structure, and operable to unlock and raise the box from the structure and withdraw it onto the truck as described.

32. In a transportation system including a truck, a load-box and a platform car, devices on the box for supporting the same and carrying locking members, means on the car receiving and fitting said devices and cooperating with said locking members to automatically lock the box on the car, and power-operated mechanism on the truck for moving said locking members to unlocking position and moving said box off or on said car.

33. In a transportation system as set forth in claim 32, further characterized by guiding means for the box carried by the platform car to enable the box to be loaded onto the car from either side, and pneumatically operated mechanism on the truck for moving the box to and from the car.

34. A transportation unit comprising a truck having chassis members for carrying a load-box, elongated expansible tubes carried in said chassis members so as to expand vertically to engage the box and to be moved longitudinally of said members, and pneumatically operable means on the truck for moving said tubes as and for the purposes described.

35. For a transportation unit of the class and for purposes herein described, an elongated expansible tube having foldable side-walls and a gripping top surface, said tube being mounted on the said unit so the said top surface is caused to move in a vertical direction, with means on the unit for expanding and contracting said tube.

36. For a transportation unit of the class and for purposes herein described, an elongated expansible tube having foldable side-walls and a gripping top surface, said tube being mounted on the said unit so the said top surface is caused to move in a vertical direction, with means on the unit for expanding and contracting said tube, said tube being mounted so as to be moved longitudinally of the unit, and means on the unit for so moving the tube.

37. For a transportation unit of the class and for purposes herein described, an elongated expansible tube having foldable side-walls adapted to be moved toward vertical planes, and means on the unit for expanding said tube to so move the side-walls.

38. For a transportation unit of the class and for the purposes herein described, an elongated expansible tube having only parts of its periphery foldable and adapted to be expanded in at least one of the three space dimensions, and means on the unit for expanding said tube.

39. Transportation means including a load-box having a plurality of skid-shoes adapted to fit cooperating parts on a receiving structure, and locking means carried by said skid-shoes for locking the same automatically to said co-operating parts when the box with skid-shoes is placed thereon.

40. Transportation means comprising a load transporting body, load manipulating readily flexible skids including pivotally connected sections carried by said body and constructed to elevate a load from said body, move the load off of said body on to a freight car, or the like, and lower the load on said car, and means carried by said body for operating said skids.

41. Transportation means comprising a load transporting body, and load manipulating means carried by said body for raising and lowering a load and moving the load horizontally of said body for loading and unloading purposes, said load manipulating means including elongated expansible tubes, and mechanism for expanding said tubes.

42. Transportation means comprising a chassis, expansible load manipulating devices arranged on said chassis in front and rear pairs, means for expanding and contracting said devices, and control means for the last-mentioned means for effecting operation of said devices either singly or in any desired combination and to any extent desired.

43. A loading and unloading apparatus for vehicles comprising a carriage, means mounted on the carriage adapted to support a merchandise container or the like during the loading and unloading operation, means for vertically reciprocating the supporting means on the carriage, actuating means for horizontally advancing and retracting the carriage and means for simultaneously vertically adjusting the carriage and actuating means.

44. A loading and unloading apparatus for vehicles comprising a carriage, fluid pressure operated jacks mounted on the carriage and means for raising and lowering said jacks to support and release a merchandise container or the like during the loading and unloading operation, actuating mechanism adapted to longitudinally reciprocate the carriage, and means for simultaneously vertically adjusting the carriage and actuating mechanism.

45. A loading and unloading apparatus for vehicles comprising a plurality of carriages, an actuating mechanism connected to each carriage for simultaneously reciprocating the carriages, a plurality of jacks on each carriage adapted to support a merchandise container or the like during the loading and unloading operation, means for operating the jacks on the carriages simultaneously, and means for simultaneously vertically adjusting the carriages and actuating mechanism.

46. An apparatus for loading a container or the like onto, or for unloading a container or the like from, a support comprising, a carriage, mechanism for moving said carriage back and forth in a substantially horizontal plane, means carried by said carriage for supporting a container or the like during a loading or unloading operation, said means being extensible for raising said container relatively to said carriage, and means for vertically adjusting said mechanism and said carriage simultaneously, whereby said carriage may be vertically positioned relatively to a support for a container.

47. An apparatus for loading a container or the like onto, or for unloading a container or the like from, a support comprising, a carriage, mechanism for moving said carriage back and forth in a substantially horizontal plane, means carried by said carriage for supporting a container or the like during a loading or unloading operation, said means being operable by fluid under pressure and extensible for raising said container relatively to said carriage, and means for vertically adjusting said mechanism and said carriage simultaneously, whereby said carriage may be vertically positioned relatively to a support for a container.

48. An apparatus for loading a container or the like onto, or for unloading a container or the like from, a support comprising, a plurality of substantially parallel carriages, mechanism for moving said carriages back and forth simultaneously in a substantially horizontal plane, means carried by each of said carriages for cooperatively supporting a container or the like during a loading or unloading operation, said means being extensible and simultaneously operable by fluid under pressure for raising said container relatively to said carriages, and means for vertically adjusting said mechanism and said carriges simultaneously, whereby said carriages may be vertically positioned relatively to a support for a container.

NELSON A. LUDINGTON.